United States Patent [19]
Patterson et al.

[11] Patent Number: 5,102,372
[45] Date of Patent: Apr. 7, 1992

[54] BICYCLE DERAILLEUR CABLE ACTUATING SYSTEM

[75] Inventors: Sam H. Patterson; John D. Cheever; Jeffery M. Shupe, all of Chicago, Ill.

[73] Assignee: Sram Corporation, Chicago, Ill.

[21] Appl. No.: 672,431

[22] Filed: Mar. 20, 1991

[51] Int. Cl.⁵ .............................................. F16H 9/00
[52] U.S. Cl. ................................................ 474/80
[58] Field of Search ............................... 474/78–82

[56] References Cited

U.S. PATENT DOCUMENTS

| | | | |
|---|---|---|---|
| 4,504,250 | 3/1985 | Juy | 474/78 X |
| 4,599,079 | 7/1986 | Chappell | 474/80 |
| 4,693,700 | 9/1987 | Chappell | 474/80 |

*Primary Examiner*—Thuy M. Bui
*Attorney, Agent, or Firm*—Albert L. Gabriel

[57] ABSTRACT

A bicycle derailleur gear shifting system having a rotatable handgrip actuator cam which is coupled with the derailleur shifting mechanism through a control cable system so as to control the derailleur mechanism. Separate actuator cams are associated with the front and rear derailleurs. For the down-shifting direction, at least the rear derailleur cam is configured so as to substantially compensate for increasing force of the derailleur return spring; so as to substantially compensate for numerous cumulative lost motions in the derailleur shifting mechanism and cable system; and so as to overshift the chain a sufficient amount beyond the destination freewheel sprocket so that the chain will approach the destination sprocket in the same direction as it would in the up-shift direction, but not sufficient to cause a double shift, or derailling from the #1 sprocket. A front derailleur cam is configured to provide fine-tuning for "cross-over" riding.

18 Claims, 17 Drawing Sheets

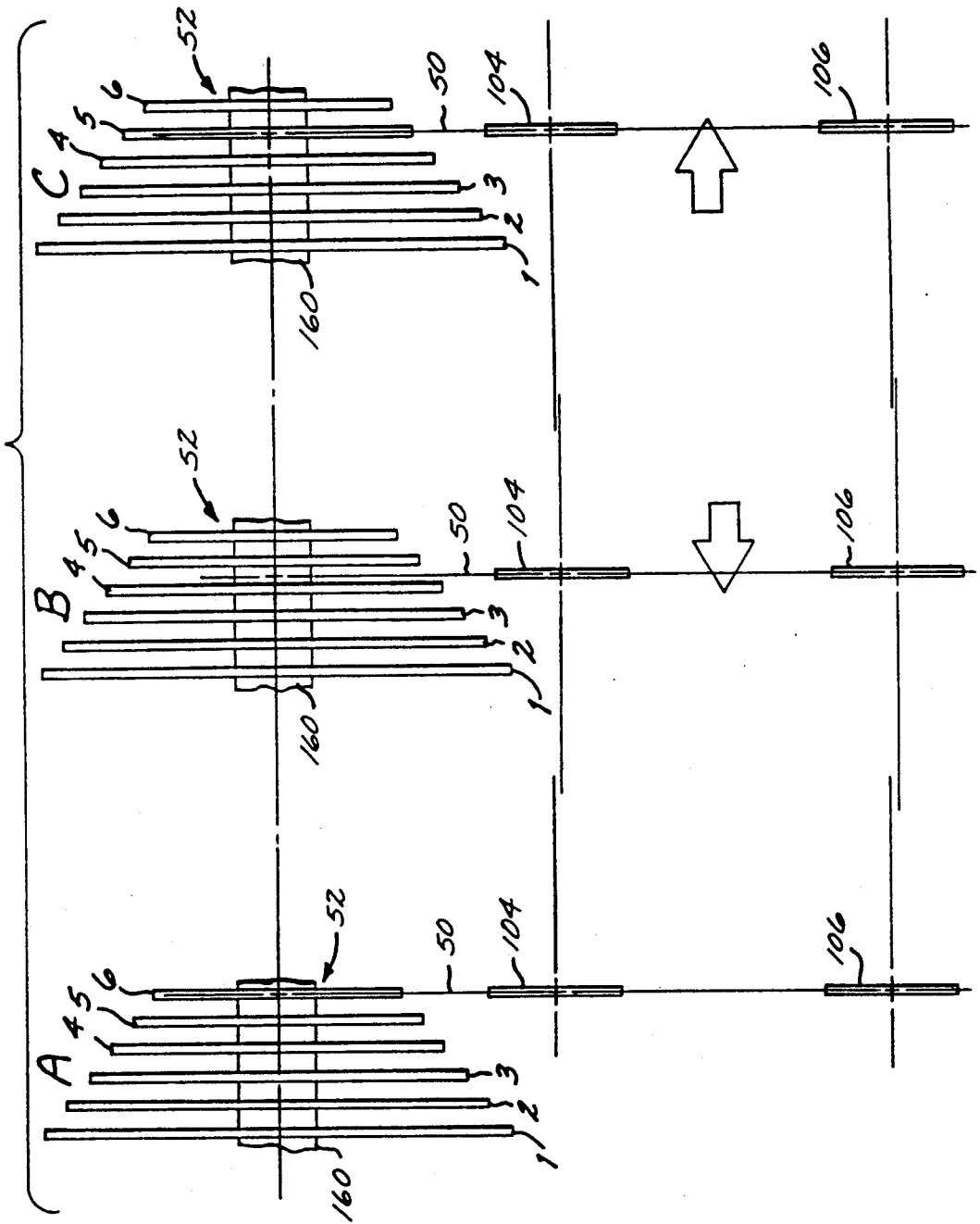

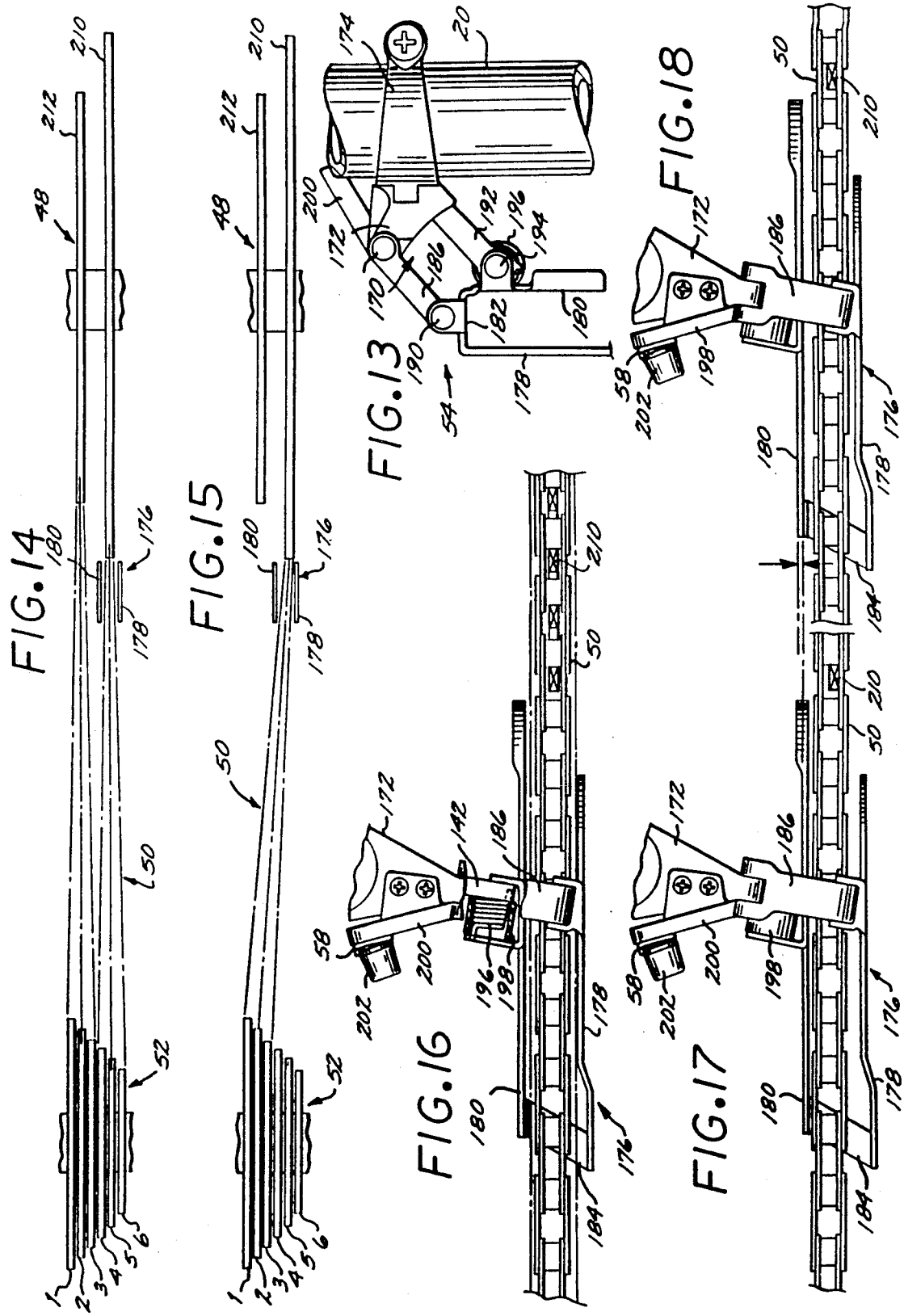

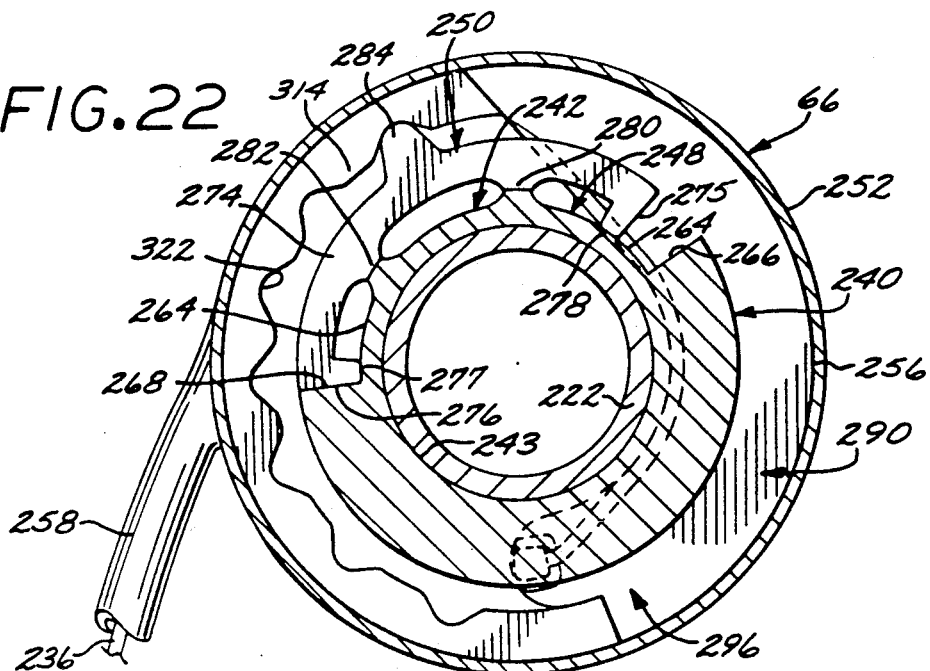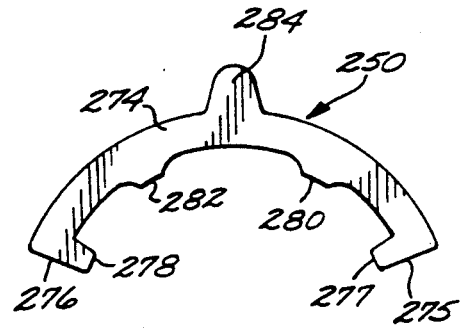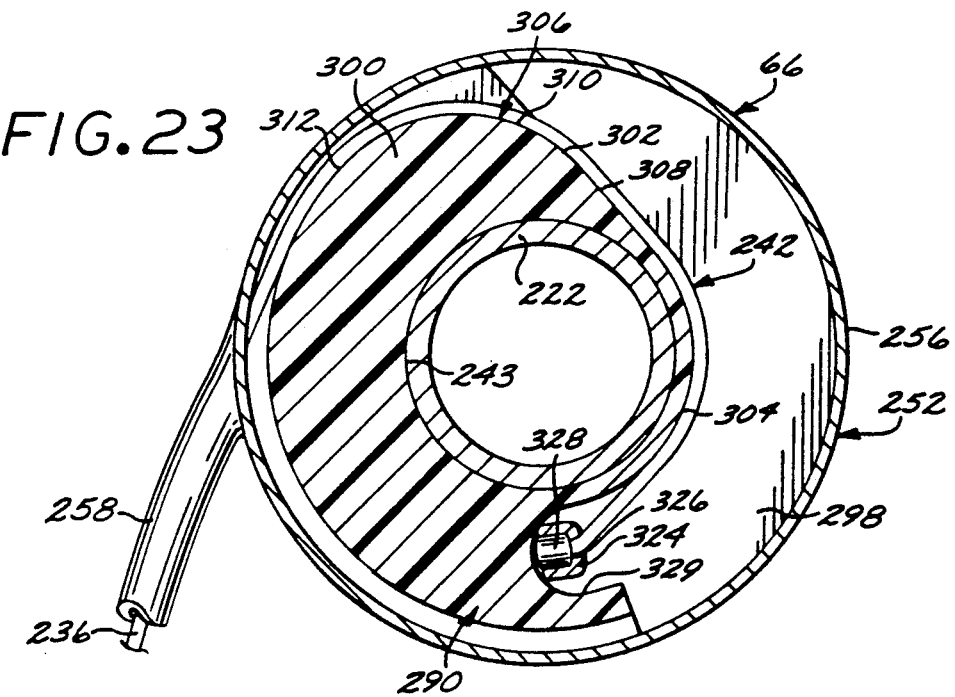

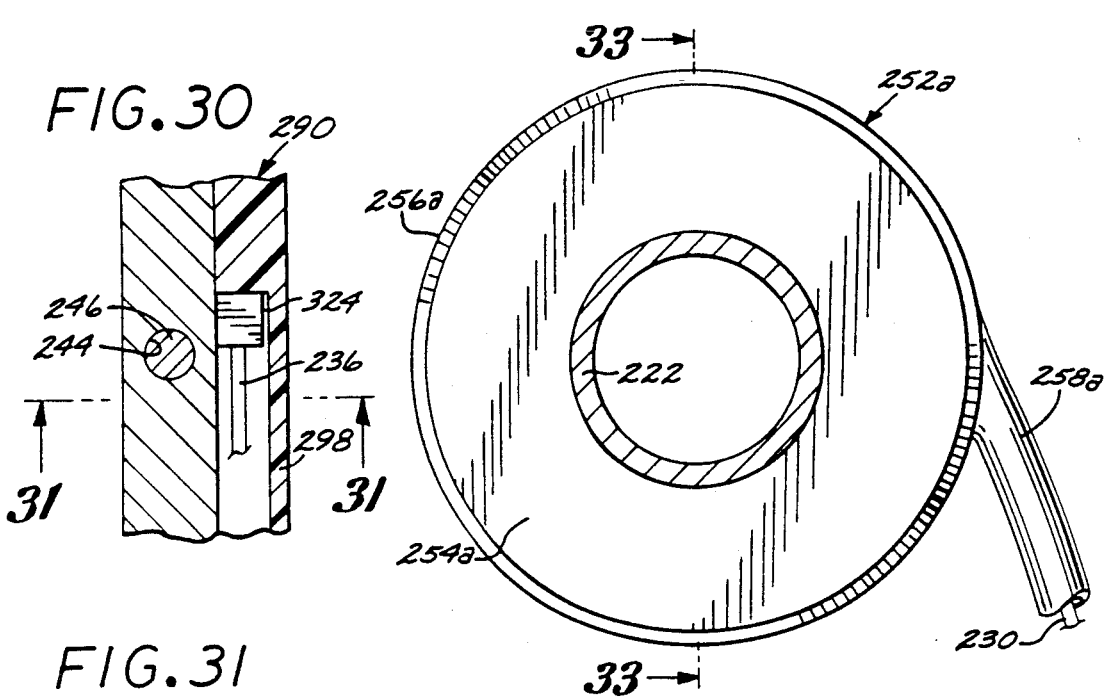
FIG. 30
FIG. 32
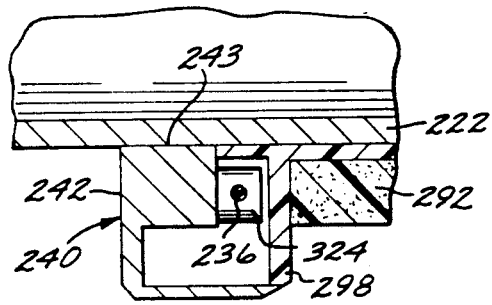
FIG. 31
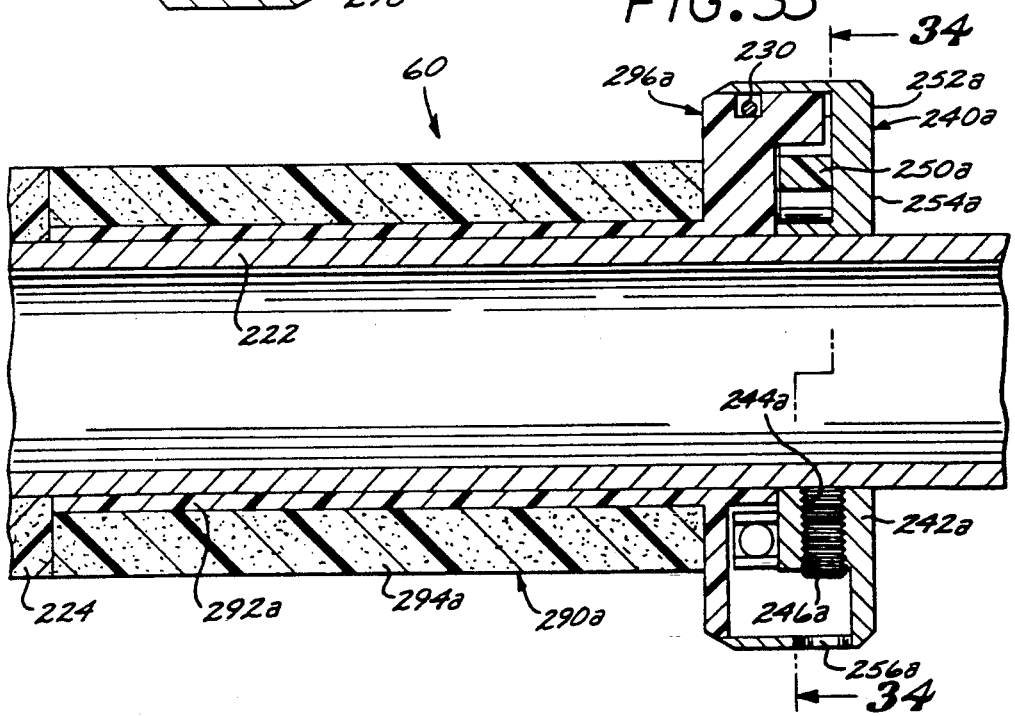
FIG. 33

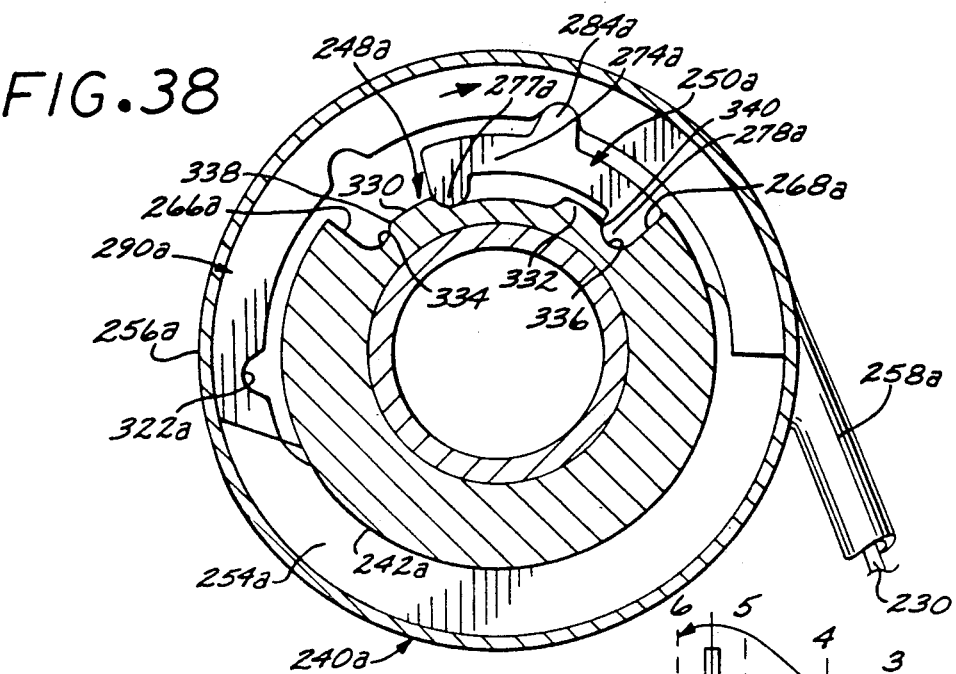
FIG. 38
FIG. 39
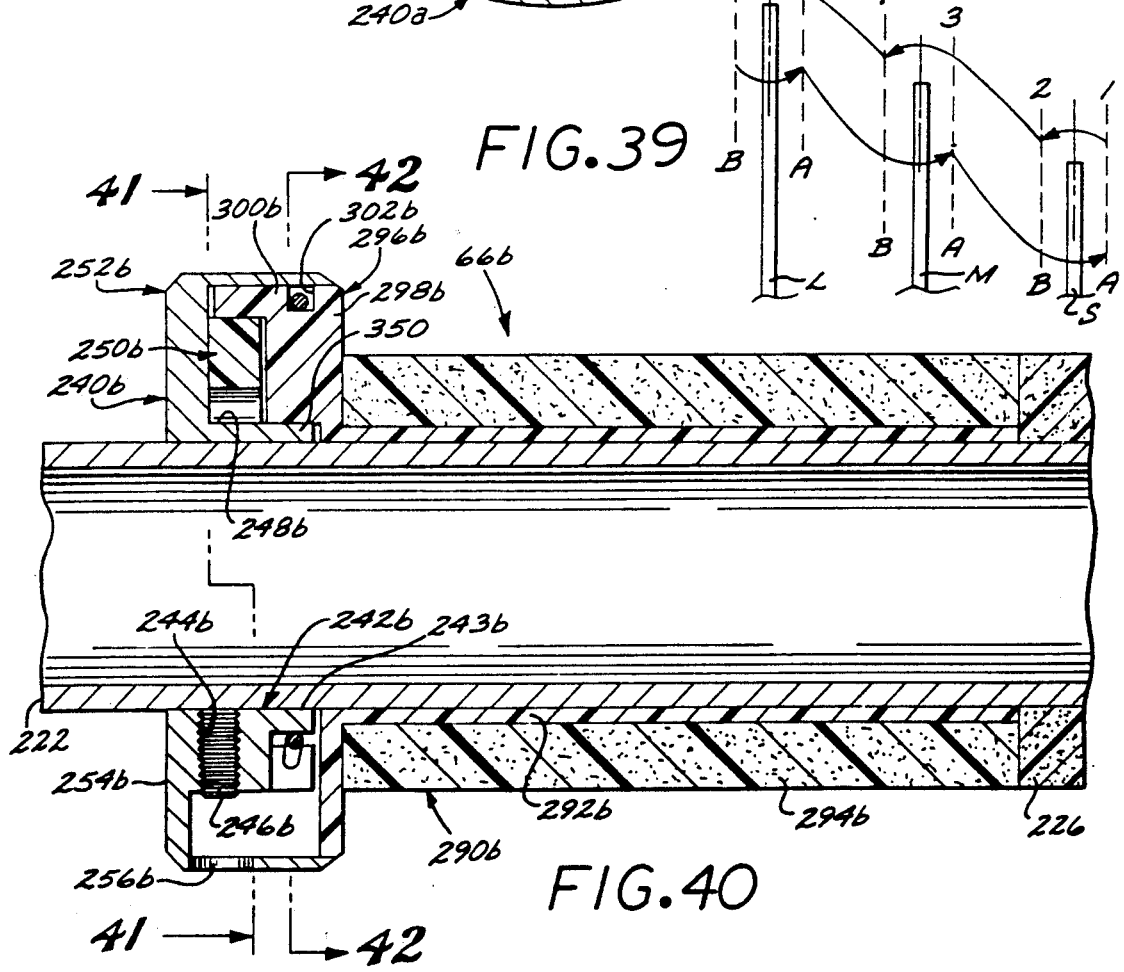
FIG. 40

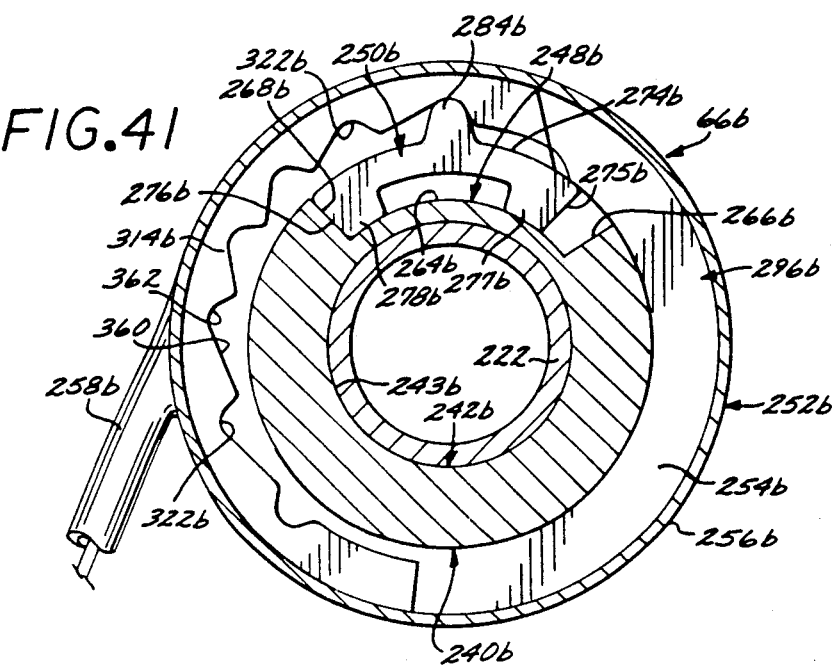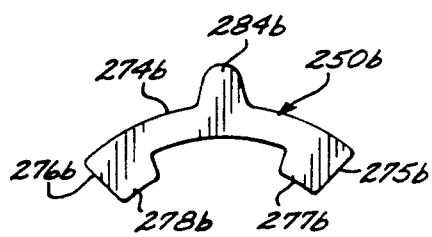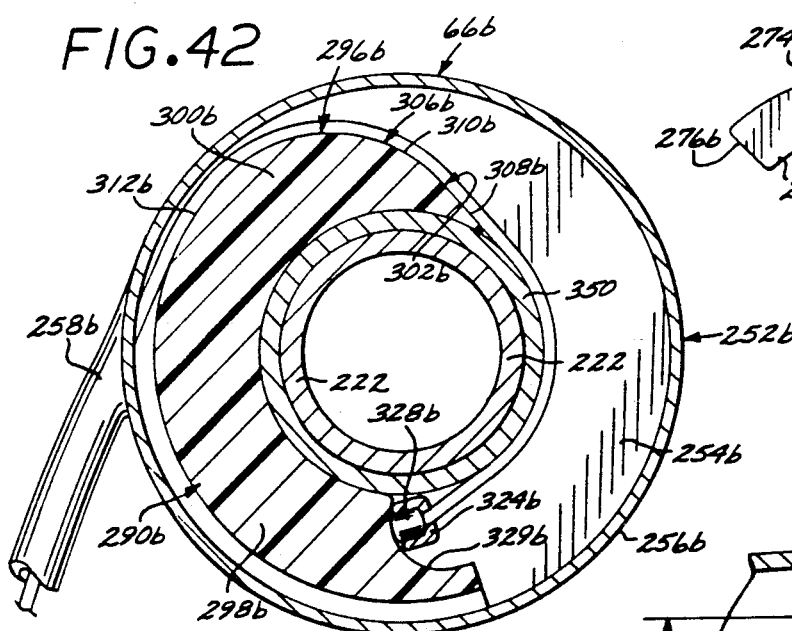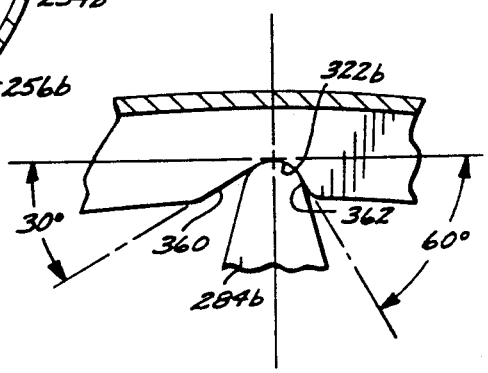

BICYCLE DERAILLEUR CABLE ACTUATING SYSTEM

BACKGROUND OF THE INVENTION

1. Field of the Invention

The present invention relates in general to derailleur-type bicycle shifting systems, and more particularly to such a system wherein front and rear derailleur mechanisms are precisely controlled by respective rotatable handgrip shift actuators.

2. Description of the Prior Art

There has been a long-felt but previously unfulfilled need in the art for a bicycle derailleur shifting system which does not require that a hand, or least a thumb, be removed from the handlebar during shifting. Many derailleur shifting devices are actuated by levers mounted on the down tube of the frame, while some are mounted on the top tube and others on the handlebar. Such levers mounted on the down tube or the top tube all require that a hand be completely removed from the handlebar during shifting. Some derailleur shifting levers mounted on the handlebar can be actuated by taking a thumb off the handlebar and pushing the lever with the thumb, but this also diminishes control of the bicycle, and is awkward, so most riders simply take their hand off the handlebar to move the shift lever. For both safety and convenience, it is desirable to be able to shift derailleur mechanisms with both hands right on the handlebars. Despite a long-felt need for such a derailleur shifting system, applicant is not aware of any prior art derailleur shifting system where the shifting events can be accomplished with both hands on the handlebar.

Typical prior art derailleur shifting mechanisms which require removal of the hand, or at least the thumb, from the handlebar are disclosed in the following U.S. Pat. Nos.: Ross 4,055,093; Hedrich 4,194,408; Cirami 4,201,095; Bonnard 4,384,864; and Strong 4,548,092.

There has also been a long-felt but previously unfulfilled need in the art for a bicycle derailleur shifting system which is capable of "overshifting," yet which is relatively uncomplicated and inexpensive. Overshifting is movement of the chain beyond the destination sprocket, and then back into alignment with the destination sprocket. It has long been known in the art that such overshifting is desirable during down-shifting events for earlier and smoother shifts. Most derailleur shifting systems do not have any built-in mechanism for accomplishing such overshifting, and require that the rider deliberately move the shifting lever beyond the location of the destination sprocket and then back to the destination sprocket. This requires two rider inputs, one being a determination of the desired extent of overshift, and the other being the time duration of the overshift. Satisfactory overshifting by this means requires considerable skill.

Applicant Patterson is the patentee in two prior U.S. Pat. Nos. 4,900,291 and 4,938,733, both of which disclose bicycle derailleur shifting apparatus having a built-in overshift feature. The present invention accomplishes the same overshifting function with a more simplified, and hence economical, cam structure which produces the overshifting.

Applicants are aware of two additional prior art patents which disclose bicycle derailleur shifting apparatus having a built-in overshift feature. These are Yamasaki U.S. Pat. No. 4,267,744 and Bonnard U.S. Pat. No. 4,384,864. Both of these are very complicated mechanisms. Each of these devices has a built-in determination of the amount of overshift travel, yet neither of them determines the timing of the overshift. This is left up to the rider, who must first move a lever to the overshift position, and then move the lever back to the normal shift position.

Another problem with the Yamasaki and Bonnard overshift mechanisms is that they each provide the same amount of overshift travel for each one of the sprockets of a rear derailleur freewheel. The problem with this is that in many derailleur systems, the most advantageous extent of overshift travel varies for different freewheel sprockets. Another problem with the built-in overshift features in both Yamasaki and Bonnard is that an optimum amount of overshift for the other freewheel sprockets is generally too much for the #1, lowest gear sprocket closest to the wheel. An optimum amount of overshift travel for the other freewheel sprockets is likely to cause derailling from the #1 sprocket, which could seriously damage the bicycle. Thus, since the overshift amount is the same for all sprockets, it is inherent that neither of the Yamasaki or Bonnard overshift mechanisms produces sufficient overshift travel for optimum down-shifting.

Another long-noted problem in the art is the provision of an accurate front derailleur system capable of handling not only "parallel riding" but also "cross-over riding." For example, with a two-chain wheel front derailleur system, for parallel riding the larger chain wheel will service the smaller rear freewheel sprockets, and the smaller chain wheel will service the larger freewheel sprockets. With cross-over riding, the chain may be crossed over from the larger chain wheel to relatively large freewheel sprockets, or the chain may be crossed over from the smaller chain wheel to relatively small freewheel sprockets. Such crossed-over chain locations have a propensity for causing undesirable "chain rasp," and the usual prior art solution to this problem was simply to provide a front derailleur chain cage having a relatively wide gap between the cage plates. While this may reduce chain rasp, it causes the further problems of inaccuracy in shifting, and frequent chain derailling. While this problem has been solved in the apparatus disclosed in applicant Patterson's aforesaid U.S. Pat. Nos. 4,900,291 and 4,938,733, it is a purpose of the present invention to solve this problem with a more simplified type of apparatus.

A further problem in the art, which relates primarily to rear bicycle derailleur shifting systems, is that there are numerous points of lost motion in both the derailleur mechanism and its actuating cable which cumulatively add up to a considerable amount of overall lost motion, as for example from about 0.040 to about 0.070 inch. Applicants have found that for accurate index shifting, substantially all of this cumulative lost motion must first be taken up at the shift actuator before the actual shift increment of travel between adjacent sprockets is applied during a down-shifting event. The apparatus of applicant Patterson's aforesaid U.S. Pat. Nos. 4,900,291 and 4,938,733 provides compensation for such cumulative lost motion, and it is a purpose of the present invention to provide more simplified apparatus which also compensates for such cumulative lost motion.

It has long been recognized in the art that rotary handgrip devices can be useful for controlling vehicle mechanisms, particularly on motorcycles, but also on bicycles. Several of such devices are disclosed in French Patent 829,283 to Braumandl. The first such devices of which applicants are aware having been employed in cooperation with bicycle derailleur shifting apparatus is the rotating gear shifting apparatus disclosed in applicant Patterson's aforesaid U.S. Pat. Nos. 4,900,291 and 4,938,733. A purpose of the present invention is to provide such apparatus in a more simplified form.

SUMMARY OF THE INVENTION

In view of these and other problems in the art, it is a general object of the present invention to solve the problems associated with prior art bicycle derailleur shifting systems.

Another object of the invention is to provide a bicycle derailleur shifting system which embodies a shift actuator that is conveniently rotatably mounted about the handlebar and so located as to not require the rider to remove a hand, or even a thumb, from the handlebar to effect a shifting event, thereby providing improved shifting convenience and safety.

Another object of the invention is to provide a bicycle derailleur shifting system embodying a shift actuator which is particularly simple in construction and economical to manufacture, yet which, in combination with the derailleur mechanism, has improved performance over most prior art derailleur shifting systems in all respects.

Another object of the invention is to provide bicycle derailleur shifting apparatus having a handgrip shift actuator embodying a novel cam mechanism for pulling and releasing cable wherein an otherwise fixed cable end portion is looped over a "shovel cam" lobe structure that slideably pulls cable when rotated in one direction, and slideably releases cable when rotated in the other direction.

Another object of the invention is to provide a bicycle derailleur shifting system which completely accounts and compensates for numerous lost motions in the derailleur mechanism and its actuating cable, thereby enabling precise index shifting to be accomplished.

A further object of the invention is to provide a bicycle derailleur shifting system wherein cable lost motion factors such as cable housing compressability and warp are minimized and made very predictable to assist in accurately determining and compensating for all cumulative lost motion factors.

Another object of the invention is to provide a bicycle derailleur shifting system in which a rotary handgrip shift actuator cooperates with the derailleur mechanism so as to enable down-shifting to be easily accomplished with substantially uniform twisting effort by the rider for down-shifting through all of the gears, despite progressively increasing derailleur return spring loading for increasingly lower gear ratios.

Another object of the invention is to provide a rear bicycle derailleur shifting system in which the derailleur return spring force is compensated for so that down-shifting and up-shifting events require generally the same amount of force.

A further object of the invention is to provide a bicycle derailleur shifting system in which a rotary handgrip shift actuator cooperates with the derailleur mechanism in providing an optimum amount of overshift for down-shifting to each of the gears, despite variations that may be present in spacing between different rear freewheel sprockets.

A further object of the invention is to provide a bicycle derailleur shifting system wherein a rotary handgrip shift actuator has built-in overshift capability, yet is very simple in construction.

A further object of the invention is to provide a bicycle derailleur shifting system which has built-in overshift capability, yet does not require manual input to define all or part of the overshift actuation.

A further object of the invention is to provide a bicycle derailleur shifting system wherein a rotary handgrip shift actuator effects overshift increments an optimum amount relative to each rear derailleur freewheel sprocket for the most positive and accurate index shift events possible.

A still further object of the invention is to provide a bicycle derailleur shifting system wherein a front derailleur mechanism is actuated by a rotary handgrip shift actuator capable of fine-tuning the shift positions to accommodate cross-over riding.

Another object of the invention is to provide a bicycle derailleur shifting system having built-in overshift, wherein the overshift timing is automatically established by the natural shifting movement, and does not require separate rider input.

Yet a further object of the invention is to provide a bicycle derailleur shifting system having a handgrip shift actuator rotatably mounted on a handlebar inboard of the handlebar end.

According to the invention, a bicycle equipped with front and rear derailleurs has front and rear handgrip shift actuators rotatably mounted over the handlebar, the front handgrip shift actuator being operatively associated with the front derailleur mechanism for shifting the front derailleur, and the rear shift actuator being operatively associated with the rear derailleur mechanism for shifting the rear derailleur. The rear handgrip shift actuator is preferably mounted on the right side of the handlebar and the front handgrip shift actuator mounted on the left side of the handlebar to accommodate most riders, since the rear derailleur is shifted more frequently than the front derailleur.

Each handgrip shift actuator of the invention contains what applicants refer to as a "shovel cam" which has a rounded cam lobe that, in effect, picks up and expands the cable end within the actuator during down-shifting, and reverses the motion to release cable during up-shifting. The rotating portion of the actuator which carries the shovel cam also has a series of detents preferably corresponding to the number of rear freewheel sprockets or front chain ring sprockets. These detent notches in the rotatable portion of the actuator ride on a spring member which slides between controlled limits in a groove which is located on a fixed portion of the actuator that is secured to the handlebar. Slideable shifting movement of the spring between its limits enables the grip rotator to take up lost motions or "slop" in the rear derailleur system and its cable system during down-shifting before an actual shifting event occurs; and then allows for release of these lost motions during up-shifting. The sliding action of the spring additionally provides an overshift increment of movement of the cable during down-shifting of the rear derailleur mechanism.

In one form of rear derailleur shift actuator according to the invention, the rate of this detent spring is shifted from a relatively lower spring rate for down-shifting and a relatively higher spring rate for up-shifting, so as to substantially compensate for the higher force of the derailleur return spring during down-shifting. In another form of the invention, rear derailleur spring force is compensated for by providing a gentler angle of inclination on the down-shifting slopes of the spring detent notches than on the up-shifting slopes.

The front shift actuator of the invention preferably employs a detent spring having two separate detent systems, one being a primary radially outwardly facing indexing projection which seats in detents in the rotating part of the shifter, as for example three spaced detent notches corresponding to three chain rings of a front derailleur mechanism. A secondary detent system involves engagement of end feet on the spring within fixed notches on the inner stationary part of the shifter. The primary detent system is prioritized over the secondary one so that the rotatable part of the shifter will first move the spring to allow for an overshift increment of cable movement during down-shifting events, and move the spring back to release cable at the commencement of up-shifting events. However, movement of the shifter rotator a relatively small nonshifting amount so as to shift the spring back and forth between its two secondary detented positions in the fixed part of the actuator enables the rider to shift the chain back and forth in each chain ring position so as to eliminate chain rasp, regardless of what position the chain may be on the rear derailleur freewheel.

The handgrip shift actuators of the present invention, are, according to current bicycle rider desires, now preferably mounted on the handlebar inboard of fixed handlebar grips. However, the shift actuators of the present invention are equally adaptable for mounting on the ends of the handlebars, or anywhere it is desired to mount them on the handlebars.

An important aspect of the present invention is the coaction between the rotary handgrip shift actuator and any one of a number of different derailleur systems. Each of the various derailleur systems has its own special operating characteristics which must be accounted for in a handgrip cam of the present invention, these characteristics including a variety of lost motions in both the derailleur mechanism and its cable system, varying spacings between the freewheel sprockets, derailleur return spring force and the rate of variation of that force as the derailleur mechanism shifts the chain either downwardly toward larger freewheel sprockets or upwardly toward smaller freewheel sprockets, and the like. Applicants preferably provide a special handgrip shovel cam with a contour specially configured to account and/or compensate for all of these special characteristics of any particular derailleur system, to the end that each shift from one freewheel sprocket to another is an early, positive, and accurately aligned index shift. Thus, applicants' rear shift actuator shovel cam cooperates with the rear derailleur system in compensating for the sum of all of the lost motions in the derailleur system and its cable system, and in providing an optimum amount of overshift for down-shifting to each of the gears. The operating characteristics of front derailleur mechanisms are similarly accounted and compensated for.

Built-in overshift is programmed on applicants' handgrip shift actuator shovel cams so as to provide optimum overshift for each down-shift event. Such overshift does not require separate manual input for the timing of the overshift; the natural rotational movement of the handlebar shift actuator automatically times the overshift.

BRIEF DESCRIPTION OF THE DRAWINGS

These and other objects and advantages of the invention will become more apparent in reference to the following description and the accompanying drawings, wherein:

FIG. 12 is a diagrammatic view illustrating overshift;

FIG. 13 is a fragmentary elevational view of a front derailleur mechanism;

FIG. 14 is a diagrammatic view illustrating parallel riding;

FIG. 15 is a diagrammatic view illustrating crossover riding;

FIG. 16 a fragmentary plan view illustrating parallel riding;

FIG. 17 is a view similar to FIG. 16 illustrating crossover riding;

FIG. 18 is a view similar to FIGS. 16 and 17 illustrating correction of the cross-over of FIG. 17 by shifting of the detent spring from one of its inner detented positions to the other;

FIG. 22 is a cross-sectional view taken on the line 22—22 in FIG. 21, illustrating a detent system embodied in a first form of rear derailleur actuator according to the invention;

FIG. 22A is an elevational view of the detent spring embodied in the form of the invention shown in FIG. 22;

FIG. 23 is a cross-sectional view taken on the line 23—23 in FIG. 21, illustrating the presently preferred shovel cam configuration of the present invention wherein the cam lobe expands cable during down-shifting cable pulling, and releases cable during up-shifting cable releasing;

FIG. 30 is an enlarged, fragmentary view taken on the line 30—30 in FIG. 21 illustrating the cable end connection within the rear derailleur handgrip shift actuator of the invention;

FIG. 31 is an enlarged, fragmentary view taken on the line 31—31 in FIG. 30;

FIG. 32 is a cross-sectional view taken on the line 32—32 in FIG. 19, which is similar to FIG. 20 but illustrates the front handgrip shift actuator on the left-hand side of the handlebar;

FIG. 33 is an axial sectional view taken on line 33—33 in FIG. 32, which is similar to FIG. 21, but illustrates the front derailleur handgrip actuator;

FIG. 38 is a similar view which illustrates the commencement of a series of front derailleur up-shifting events;

FIG. 39 is a diagrammatic view illustrating sequences of down-shifting and up-shifting events for a three-chain ring front derailleur mechanism;

FIG. 40 is a view similar to FIG. 21 for a second and presently preferred form of rear derailleur actuator according to the invention;

FIG. 41 is a cross-sectional view taken on the line 41—41 in FIG. 40 corresponding to FIG. 22, illustrating the mechanism of FIG. 40 in its fully up-shifted condition;

FIG. 41A shows an arcuate spring member;

FIG. 42 is a cross-sectional view taken on the line 42—42 in FIG. 40, corresponding to FIG. 23, illustrating the mechanism of FIGS. 40 and 41 in the fully up-shifted condition;

FIG. 43 is a greatly enlarged fragmentary view illustrating the detenting arrangement in the second form of rear derailleur actuator illustrated in FIGS. 40-42;

DETAILED DESCRIPTION

FIGS. 1-18 illustrate a derailleur-equipped bicycle, generally designated 10, showing details of both the rear and front derailleur apparatus, presently preferred derailleur actuating cable systems, and defining locations in the derailleur and cable systems of lost motion or "slop" which are accurately accounted for in the present invention.

Figure 1:
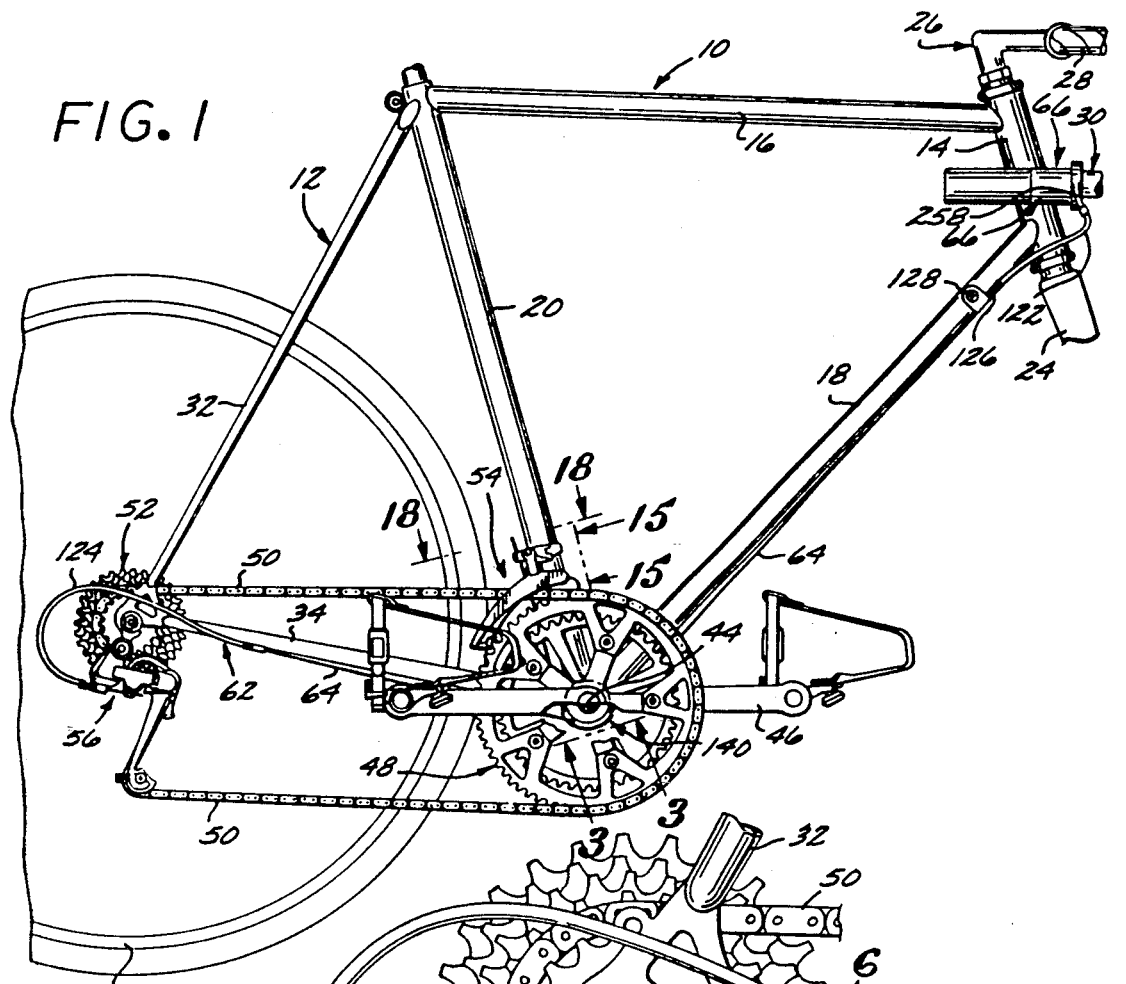
FIG. 1 is an fragmentary side elevational view of a bicycle embodying front and rear derailleurs, and front and rear derailleur shifters according to the present invention.

Bicycle 10 has a frame 12 including a head tube 14, top tube 16, main down tube 18, seat tube 20, bottom bracket 22, front fork 24, handlebar stem 26, handlebar 28 with end portions 30, and down fork 32 and bottom fork 34. Handlebar 28 illustrated in FIG. 1 is the traditional drop type, although the invention is equally applicable to any type of bicycle handlebar, such as the "mountain bike" type illustrated in FIG. 19. The rear ends of down fork 32 and bottom fork 34 are connected to a pair of spaced dropouts 36 within which the rear axle bolt 38 is fixedly mounted for supporting rear wheel 39. The rear wheel hub rotates on ball bearings about axle bolt 38, and a lateral extension of the wheel hub supports the rear derailleur freewheel on its outside, with ratchet means therebetween which engages when chain power is applied to the freewheel, and disengages to allow free rolling of the rear wheel relative to the derailleur freewheel. A derailleur hanger 40 is integrally formed with dropout 36, extending downwardly therefrom.

A pedal crank, generally designated 44, is journalled in bottom bracket 22, and includes a pair of pedal arms 46 on opposite sides of frame 12, and front derailleur chain ring cluster 48 on the right-hand side of frame 12 inboard of right-hand pedal crank 44. Chain ring cluster 48 shown in FIGS. 1 and 14-18 has two chain rings, the operation of which in connection with the present invention will be discussed in detail hereinafter. Actuation of a three-chain ring cluster is described hereinafter in connection with FIGS. 32-38. In FIG. 1, drive chain 50 is shown engaged over the larger of the two chain rings, and extends rearwardly therefrom into engagement with derailleur multiple freewheel 52 for applying power to rear wheel 39. The multiple freewheel 52 shown has a six-sprocket cluster.

Figure 19:
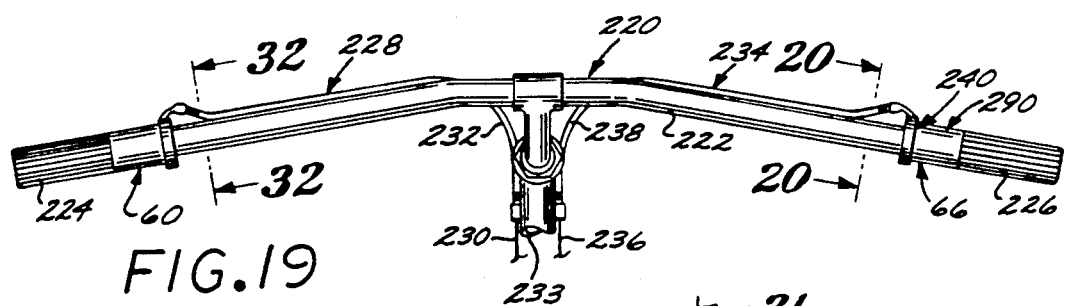
FIG. 19 is a fragmentary elevational view of the handlebar end portion of a mountain bike embodying the front and rear handgrip shifting mechanisms of the present invention.

The front derailleur mechanism is generally designated 54, and the rear derailleur mechanism is generally designated 56. Front control cable 58 connects front derailleur mechanism 54 to a front handgrip shift actuator 66 as shown in FIG. 19, connecting in the same manner that rear control cable 64 connects to the rear handgrip shift actuator 66 as shown in detail in FIGS. 19-31.

The rear derailleur cable system is generally designated 62, and includes rear control cable 64 which extends from rear derailleur mechanism 56 to rear handgrip shift actuator 66 that is mounted on right-hand handlebar end portion 30. The connection of rear control cable 64 to rear derailleur shift actuator 66 is described in detail in connection with FIGS. 19-31.

The Rear Derailleur Mechanism

The apparatus of rear derailleur mechanism 56 is best illustrated in FIGS. 1, 2, and 8-11.

At the heart of rear derailleur mechanism 56 is a parallelogram generally designated 70 which has a rear support body pivotally but laterally fixedly connected to hanger 40, a pair of parallel links extending forwardly from the support body, and a shifter body attached to the forward ends of the links that is shiftable laterally inwardly toward the bicycle frame 12 under the influence of cable tension, and shiftable laterally outwardly away from frame 12 under the influence of a derailleur return spring contained in the parallelogram.

Figure 8:
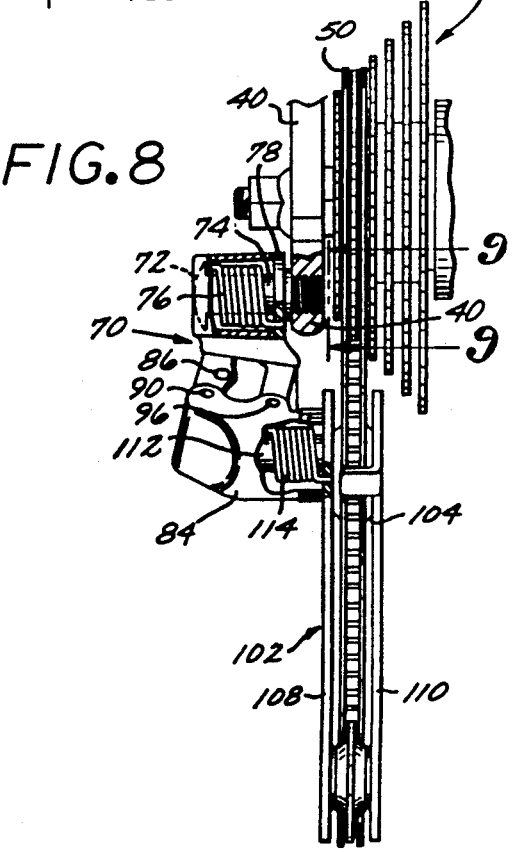
FIG. 8 is a fragmentary elevational view, with portions broken away, taken on the line 8—8 in FIG. 2.
Figure 9:
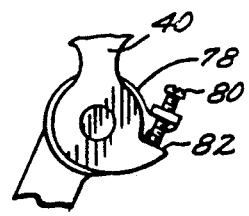
FIG. 9 is an enlarged fragentary elevational view illustrating an adjustment feature of the rear derailleur mechanism of FIG. 2.

The rear support or mounting body is designated 72, and is pivotally mounted on a mounting bolt 74 which is threadedly connected to hanger 40 as best seen in FIG. 8. A helical pivot spring 76 around pivot bolt 74 is housed in support body 72 and biases support body 72 clockwise or forwardly about bolt 74. One end of spring 76 bears against body 72, while the other bears against a plate 78 as best seen in FIGS. 8 and 9. A support body angle adjust screw 80 on plate 78 bears against a shoulder 82 on hanger 40 for adjusting the effective torque of spring 76.

The forward shifter body 84 of parallelogram 70 is held parallel to support body 72 by the parallelogram linkage, and shifts transversely inwardly and outwardly relative to frame 12, and in particular, relative to multiple freewheel 52. An outer parallelogram link 86 connects support body 72 and shifter body 84 by means of respective pivot pins 88 and 90; and an inner parallelogram link 92 connects support body 72 and shifter body 84 through respective pivot pins 94 and 96.

Figure 2:
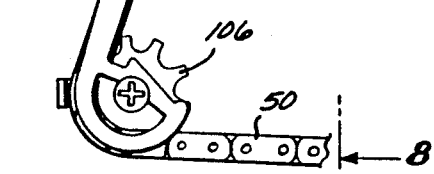
FIG. 2 is an enlarged fragmentary elevational view of the rear derailleur system of FIG. 1.
Figure 10:
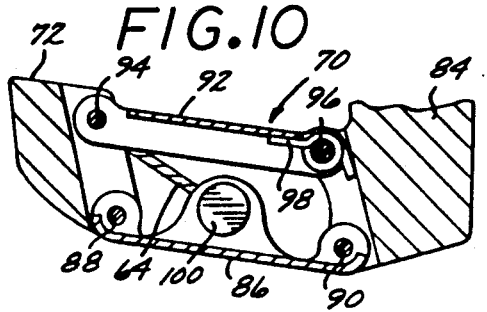
FIG. 10 is a fragmentary sectional view taken on the line 10—10 in FIG. 2.

Derailleur return spring 98 is best seen in FIG. 10, and is a helical spring with its coil located around pivot pin 96, and having respective arms which bear against shifter body 84 and link 92 so as to bias parallelogram 70 toward a flattened, more closed condition, thereby biasing shifter body 84 laterally outwardly relative to frame 12 and freewheel 52. A cable clamp 100 seen in FIGS. 2, 8 and 10 is mounted on outer parallelogram link 86 for clamping the end of cable 64. Increased tension on cable 64 pulls parallelogram 70 toward a more open, rectangular configuration, thereby moving shifter body 84 inwardly relative to frame 12 and freewheel 52.

A pulley cage 102 is pivotally supported on the inner end of shifter body 84, extending downwardly therefrom. An upper guide or jockey pulley 104 is freely rotatably supported in the upper part of pulley cage 102 adjacent shifter body 84, and a lower tension pulley 106 is freely rotatably mounted in the lower portion of pulley cage 102. Cage 102 consists of outer and inner cage plates 108 and 110, respectively, outer cage plate 108 being mounted on a cage pivot bolt 112 which projects from shifter body 84. Pulley cage 102 is biased clockwise or rearwardly by means of a cage pivot tension spring 114 inside shifter body 84 which works against body 84 and outer cage plate 108.

Chain 50 extends rearwardly from one of the two chain rings of chain ring cluster 48 over one of the six sprockets of multiple freewheel 52, then downwardly and forwardly over the front of guide pulley 104, then downwardly and rearwardly over the rear of tension pulley 106, and then forwardly back to the chain wheel. Guide pulley 104 shifts laterally according to lateral movements of shifter body 84 under the influence of rear control cable 64 as directed by rear handgrip shift actuator 66 so as to shift chain 50 downwardly or upwardly from sprocket to sprocket of freewheel 52. As chain 50 shifts from a larger to a smaller sprocket on freewheel 52, more chain becomes available in the overall chain loop, and tension pulley 106 moves rearwardly under the influence of cage pivot tension spring 114 to take up this slack. Conversely, as chain 50 shifts from a smaller to a larger sprocket of freewheel 52, tension pulley 106 gives way forwardly against the force of tension spring 114 to provide the necessary additional chain length for the added circumference of the larger freewheel sprocket.

Rear Derailleur Cable System

The rear derailleur cable system 62 is constructed to minimize and strictly limit lost motions or "slop" commonly found in bicycle shift cables, and make whatever lost motions that are inevitable as predictable as possible so they can be accurately taken up and compensated by the cam member in handgrip shift actuator 66. Such lost motions commonly occur from cable housing flexure under down-shifting cable tension toward rounding out of the cable housing, looseness of the cable in its housing, cable housing compression, cable stretch, and lost motion in cable adjustment barrels. Cable system 62 is also constructed to minimize friction between the cable and its housing so as to further reduce cable housing flexure, and to make down-shifting easier by substantially reducing the friction vector between housing and cable which opposes cable down-shifting movement, particularly under the relatively high pulling force on the cable that is required for down-shifting.

Figure 20:
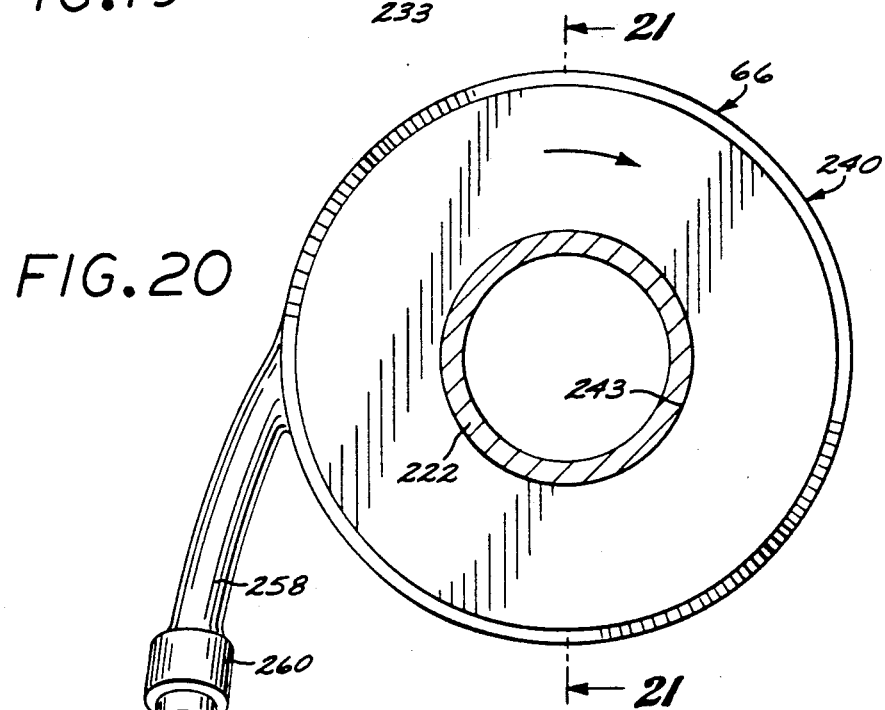
FIG. 20 is a cross-sectional view taken on the line 20—20 in FIG. 19, showing the inner end portion of the rear derailleur handgrip shift actuator of the invention (relative to the handlebar end), and the rear control cable guide tube which extends therefrom.

With these factors in mind, the rear cable housing is provided in two relatively short sections, a forward cable housing section 122 which extends to a cable guide tube 258 as seen in FIG. 20 and operatively connects with shift actuator 66, and a rearward cable housing section 124 which extends from a rearward location on bottom fork 34 to rear derailleur mechanism 56. Most of the length of rear control cable 64 is thus free of housing, and has only minimal friction against a guide under bottom bracket 22 discussed hereinafter in connection with FIGS. 3 and 4. The shortness of cable housing sections 122 and 124 greatly reduces cable compression lost motion and makes it very predictable.

Cable compression is further greatly reduced by employing a substantially axially compressionless cable housing or casing described hereinafter in connection with FIGS. 6 and 7. The construction of such substantially compressionless cable housing also greatly reduces cable housing flexure under cable down-shifting tension, and makes such flexure and consequent lost motion very predictable.

Figure 5:
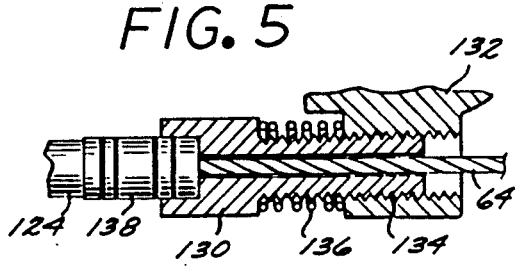
FIG. 5 is a fragmentary view, partly in section and partly in elevation, taken on the line 5—5 in FIG. 2.

Referring to FIG. 1, forward cable housing section 122 ends at a spring-loaded front cable housing adjustment barrel 126 through which cable 64 extends and which is adjustably threadedly engaged in a front bracket 128 that is affixed to the right-hand brazon near the upper end of down tube 18. Rearward cable housing section 124 ends at a rear housing adjustment barrel 130 through which cable 64 passes and which is threadedly adjustably engaged in a rear bracket 132 that is secured to derailleur support body 72. As best seen in FIG. 5, a reduced threaded portion 134 of adjustment barrel 130 carries a helical compression spring 136 which resists inadvertent rotation of barrel 130 relative to its bracket 132. There is inevitable clearance between the barrel and bracket threads, spring 136 shifting barrel 130 slightly to the left relative to bracket 132 when cable 64 is under relatively small tension when a shift is not being made. However, during a down-shift when cable 64 is under relatively large tension, barrel 130 will move toward bracket 132 through such thread clearance, which represents lost motion in the cable system. Similar lost motion will occur between front adjustment barrel 126 and its bracket 128. A ferrule 138 is crimped over the end of rearward housing section 124 and is engaged within an axial recess in adjustment barrel 130.

Figure 3:
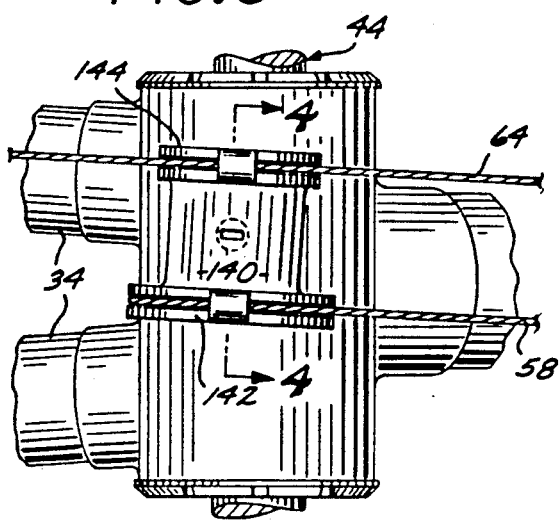
FIG. 3 is a further enlarged, fragmentary view taken on the line 3—3 in FIG. 1.
Figure 4:
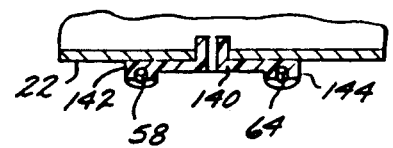
FIG. 4 is a fragmentary view taken on the line 4—4 in FIG. 3.

Referring now to FIGS. 3 and 4, a cable guide bracket 140 is secured underneath bottom bracket 22, and supports a pair of grooved, arcuate cable guides 142 and 144 under which the respective front and rear cables 58 and 64 freely slide. The front derailleur cable system, including cable 58, is the same as the forward portion of rear derailleur cable system 62. Thus, front cable 58 extends upwardly and forwardly along the main down tube 18, passing through an adjustment barrel like barrel 126 which is threaded into a bracket like bracket 128 mounted on the left-hand brazon, front cable 58 then having a cable housing section like section 122 of rear cable system 62 which extends from the adjustment barrel to a cable guide tube 258 as seen in FIGS. 32 and 34-38, and connects to front handgrip shift actuator 60. Rear cable 64 extends exposed from adjustment barrel 126 rearwardly alongside main down tube 18, under its guide 144, and thence rearwardly along bottom fork member 34 to the rear housing adjustment barrel 130.

Figure 6:
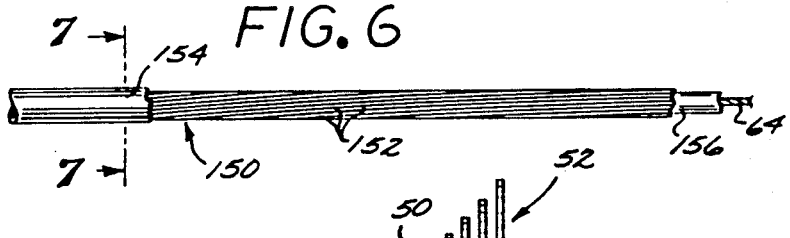
FIG. 6 is an elevational view with portions broken away taken on the line 6—6 in FIG. 2.
Figure 7:
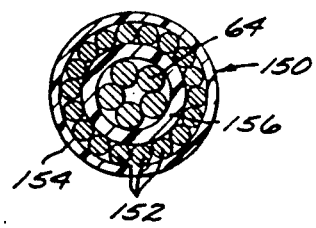
FIG. 7 is a cross-sectional view taken on the line 7—7 in FIG. 6.

FIGS. 6 and 7 illustrate the substantially axially compressionless cable housing, designated 150, which is employed for both of the cables 58 and 64, but shown with rear cable 64 therein. The core of housing 150 is an annular series of closely packed, primarily axially oriented wires 152 made of a tough metal such as steel. Wires 152 are arranged in a very slow or long helix, as for example a revolution in only about every three inches of length. The annular array of wires 152 is held in its circular configuration between an outer plastic jacket 154 and an inner plastic guide tube or liner 156. Inner guide tube 156 is made of a tough anti-friction plastic material such as a Delrin which, together with the short lengths of cable 150 in cable sections 122 and 124, greatly minimizes cable friction in the housing. Inner guide tube 156 is closely yet freely fitted about cable 64 to minimize lost motion in the curved portions of housing sections 122 and 124.

Applicants have determined that the substantially compressionless-type cable housing 150 not only substantially completely eliminates cable compression as a lost motion factor, but it also substantially minimizes the tendency for conventional cable to round out or give in a "monkey motion," thereby substantially eliminating two heretofore serious sources of lost motion.

Sources of Lost Motion in Rear Derailleur Mechanism

While the aforesaid cable system preferably employed as a part of the present invention has only minimal and very predictable lost motion, every derailleur system has numerous sources of lost motion which cumulatively add up to a substantial amount of lost motion at cable connection 100, and this cumulative lost motion varies for almost every different derailleur system, over a range of from about 0.040 inch to about 0.070 inch. For positive index shifting with applicants' handgrip shift actuator 66, a separate cam member is preferably provided for each type of derailleur mechanism so as to positively take up and account for the cumulative lost motion in each derailleur mechanism. The mode of operation of such cam member in this regard is described in detail hereinafter in connection with FIGS. 24-29.

Figure 11:
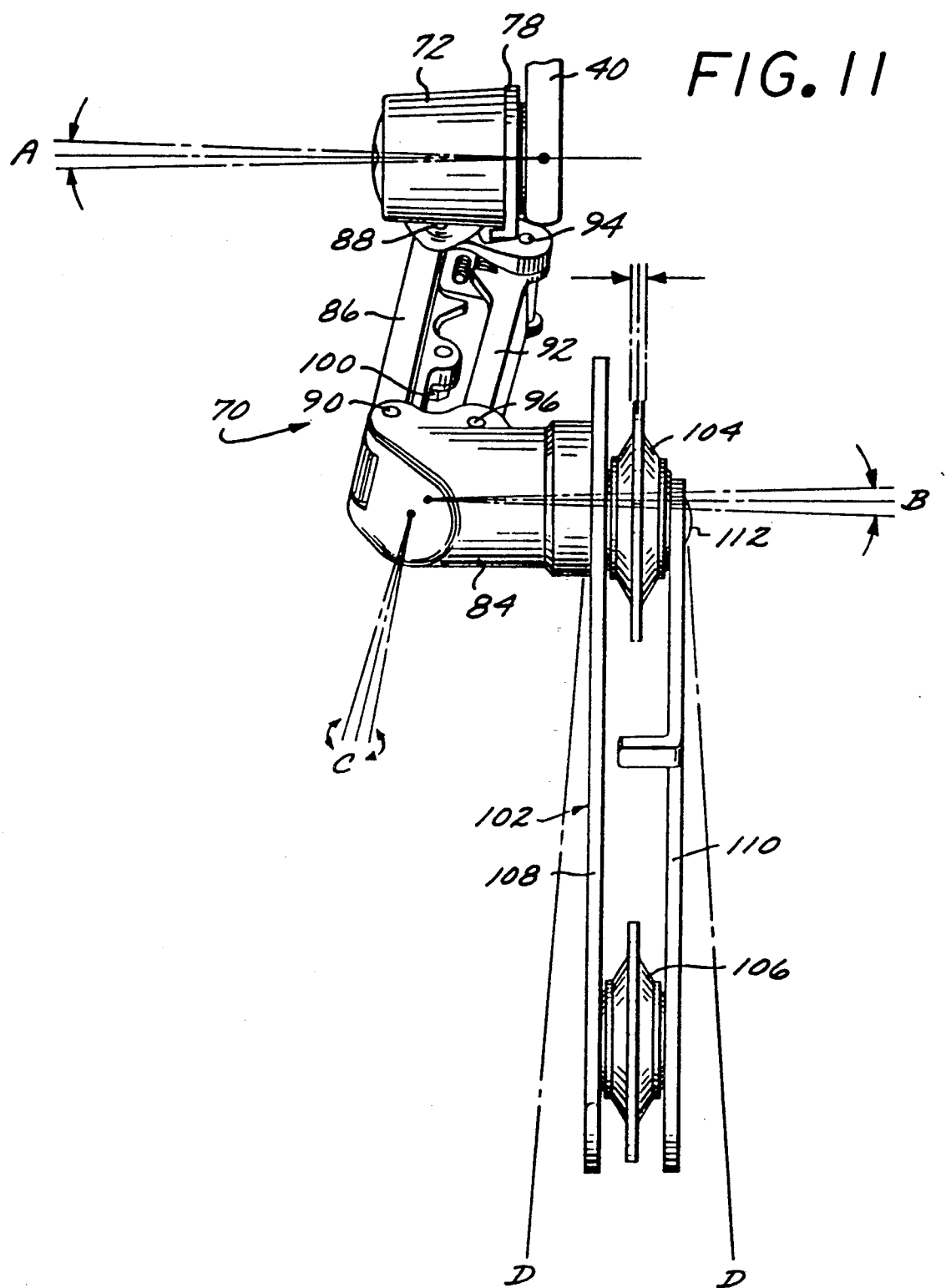
FIG. 11 is a perspective view of a portion of the derailleur mechanism shown in FIG. 2, indicating various points of lost motion.

FIG. 11 illustrates some of these points of lost motion or slop in conventional derailleur systems. First, there is a wobble type of lost motion of support body 72 on its pivot bolt 74 indicated at A in FIG. 11. Support body 72 torques downwardly or upwardly, depending upon whether the chain is being shifted inwardly to a larger freewheel sprocket or outwardly to a smaller freewheel sprocket. Next, there is lost motion at each of the four link pivot pins 88, 90, 94 and 96. When support body 724 torques or twists down as at A, then shifter body 84 twists upwardly, and when support body 72 torques or twists up, then shifter body 84 twists downwardly, these motions being indicated at B in FIG. 11. Whenever shifter body 84 twists, the parallelogram links 86 and 92 also twist as indicated at C in FIG. 11. Further, there is lost motion between cage pivot bolt 112 and shifter body 84, which translates into lost motion between pulley cage 102 and shifter body 84 as indicated at D in FIG. 11. Additionally, there is lateral lost motion of guide pulley 104 on its pivot axis.

Overshift

The cam mechanism in shift actuator 66, described hereinafter in detail in connection with FIGS. 21-29, is not only configured to account and compensate for the cumulative lost motions referred to above, but also for an overshift increment in the down-shift direction to a larger freewheel sprocket. This overshift increment serves several functions. It is the lateral angle at which guide pulley 104 addresses the chain to the next larger freewheel sprocket which causes the larger sprocket teeth to snag the chain. By moving guide pulley 104 inwardly somewhat beyond the next larger sprocket so that the chain in effect angles across the teeth of the larger sprocket, the sprocket teeth more readily snag the chain plates to provide an earlier, more positive shift. The overshift increment also causes the chain to have its final movement during a down-shifting event toward the destination sprocket from the direction of the next larger sprocket, whereby during a down-shifting event the chain makes its final approach to the destination sprocket in the same direction as it would for an up-shifting event. During an up-shifting event, as the chain approaches the smaller destination sprocket, cable tension is relaxed such that the cumulative lost motion has been relaxed or backlashed, and the force vector opposing cable movement to the final destination is small and stable because of low cable force laterally against the cable housing. The same factors hold true for a down-shift to a larger sprocket when overshift is employed so that the final destination is reached in the up-shift direction. Accordingly, both the down-shift and up-shift events to the same freewheel sprocket will result in the same accurate alignment of the chain with the sprocket. Initial alignment which is conveniently calculated for each freewheel sprocket during up-shifting thereby also provides the correct chain positioning for down-shifting to each sprocket.

FIG. 12 illustrates what is meant by "overshift." Each of FIGS. 12A, B and C diagrammatically illustrates rear derailleur freewheel 52 and its relationship to guide pulley 104 and chain 50 during a down-shifting event from freewheel sprocket #6, the smallest sprocket, to freewheel sprocket #5, the next smallest sprocket. The freewheel hub which overrides the wheel hub is diagrammatically illustrated as 160. The freewheel sprockets are numbered in their conventional order, from 1-6. In FIG. 12A, guide pulley 104 and chain 50 are operatively aligned with the #6 freewheel sprocket. A down-shift is to be made from sprocket #6 to sprocket #5, and FIG. 12B illustrates the overshift increment. Guide pulley 104 is moved or overshifted in the down-shifting direction substantially beyond alignment with the destination sprocket #5, moving chain 50 to this overshift position. Guide pulley 104 is then relaxed back to alignment with the destination sprocket #5, being moved under the influence of derailleur return spring 98 shown in FIG. 10, carrying chain 50 with it into accurate alignment with the destination sprocket #5 as shown in FIG. 12C. The final, aligned location of guide pulley 104 and chain 50 of FIG. 12C will be the same as the position of alignment for an up-shift from sprocket #4 to sprocket #5, the destination having been approached from the same direction with the cumulative lost motion released or backlashed, and the friction vector of the cable housing sections against the cable being the same.

Front Derailleur

FIGS. 13 and 16-18 illustrate details of construction of front derailleur mechanism 54 shown generally in FIG. 1. The parallelogram is generally designated 170 and is best seen in FIG. 13. The fixed member of parallelogram 170 is a support body 172 which is clamped to seat tube 20 by means of a clamp 174. The derailleur cage is generally designated 176, and consists of outer and inner cage plates 178 and 180, respectively, which are connected by an upper bridge member 182 seen in FIG. 13, and a lower bridge member 184 seen in FIGS. 16, 17 and 18. An outer, upper parallelogram link 186 is pivotally connected at its ends to support body 172 and cage 176 by means of respective pivot pins 188 and 190. An inner, lower parallelogram link 192 is also pivotally connected at its ends to support body 172 and cage 176. The cage connection pin is designated 194, but the support body connection pin is masked behind a portion of the support body as viewed.

A helical spring 196 best seen in FIGS. 13 and 16 is engaged about outer pivot pin 194 for link 192, and bears against link 192 and cage 176 so as to bias parallelogram 170 and hence cage 176 inwardly toward frame member 20 and thus inwardly toward the smaller chain ring. Spring 196 is covered by a spring housing 198.

An actuator arm 200 extends upwardly and inwardly toward frame member 20 as an extension of the upper, outer link 186. Front derailleur cable 58 is attached to actuator arm 200 proximate its free end by means of a cable clamp 202 on actuator arm 200.

Front derailleur mechanism 54 is controlled by front handgrip shift actuator 60 through cable 58. The lost motion factors previously discussed with respect to the rear derailleur system are minimized in the front derailleur system by the simplicity of the mechanism and shortness of the cable. The lost motion factors may nevertheless be accounted for in the cam mechanism of the front derailleur handgrip shift actuator 60 in the same manner as discussed in detail with respect to the rear derailleur system and associated handgrip shift actuator 66.

FIG. 14 diagrammatically illustrates locations of chain 50 when a bicycle rider is riding "parallel." Chain ring cluster 48 of FIGS. 14-18 has two chain rings, a large chain ring 210 and a small chain ring 212. Rear freewheel 52 is a six-sprocket cluster, including sprockets numbered 1-6. In FIG. 14, chain cage 176 is longitudinally aligned with large chain ring 210, and also substantially aligned with freewheel sprocket #5. In normal parallel riding, when the chain is engaged over large chain ring 210, the rear derailleur mechanism will only be actuated to shift chain 50 between the three smallest freewheel sprockets, numbers 6, 5 and 4, and with any of these three freewheel sprockets, chain 50 will remain sufficiently aligned with cage 176 to avoid rasping against either of the outer or inner cage plates 178 and 180. Similarly, with cage 176 aligned with smaller chain ring 212, with normal parallel riding, the rear derailleur will only be actuated to locate the chain on one of the three largest freewheel sprockets, numbers 1, 2 and 3, and chain rasp will be avoided.

FIG. 15 illustrates the cross-over riding situation in which chain 50 is engaged on the larger chain ring 210, but where the rear derailleur has been actuated to place the chain over one of the three largest freewheel sprockets, numbers 1, 2 or 3. This will cause chain rasp against inner cage plate 180, unless an undesirably wide chain cage 176 is provided. Such a large chain cage is conventional to accommodate cross-over riding, but can readily lead to derailling. Still referring to FIG. 15, if the chain were located over the smaller chain ring 212, and located on one of the three smallest freewheel sprockets 4, 5 or 6, a reverse cross-over situation would occur in which the chain would rasp against outer cage plate 178.

FIG. 16 shows the parallel riding situation of FIG. 14, wherein chain 50 is engaged over the larger chain ring 210, and the chain is generally centered through cage 176. FIG. 17 shows the cross-over situation of FIG. 15, with the chain engaged over the larger chain ring 210 at the front, and engaged over one of the three largest freewheel sprockets 1, 2 or 3 at the rear. The chain is seen to be rasping against inner cage plate 180 at the front of chain cage 176. FIG. 18 shows chain 50 again properly aligned in chain cage 176 after a fine-tune adjustment has been made with the cam mechanism of front handgrip shift actuator 60, as described in detail hereinafter.

"Mountain Bike"

The several forms of handgrip shift actuators of the present invention are herein shown and described in connection with a "mountain bike," which is a particularly popular type of bicycle at the present time. FIG. 19 illustrates the front end portion of a mountain bike which is generally designated 220, having a widespread handlebar 222 that angles slightly rearwardly. Conventional left and right grips 224 and 226, respectively, are located on the ends of handlebar 222. Front derailleur handgrip shift actuator 60 is engaged over handlebar 222 immediately inboard of left fixed grip 224, and rear derailleur handgrip shift actuator 66 is engaged over handlebar 222 immediately inboard of right fixed grip 226. Shift actuators 60 and 66 of the present invention are adaptable for placement at any position on the handlebar where there is a straight handlebar section. Preferably, they are placed inboard, or spaced from the end, of the handlebar as shown in FIGS. 1 and 19, but they are equally adaptable for placement proximate the ends of the handlebar.

The front derailleur cable system is generally designated 228, and includes front derailleur control cable 230 and its housing or casing 232. Front derailleur cable system 228 for mountain bike 220 is preferably the same system as that employed on a bicycle 10 shown in FIG. 1, with front cable housing or casing 232 terminating at an adjustment barrel arrangement like that shown in FIG. 5, front derailleur control cable 230 extending down alongside main down tube 233 and riding under the bottom bracket as shown in FIGS. 3 and 4, and with substantially compressionless cable housing like that shown in FIGS. 6 and 7.

The rear derailleur cable system is generally designated 234, and includes rear derailleur control cable 236, forward cable housing or casing 238, and a rearward cable housing (not shown) like that seen in FIGS. 1 and 2. Rear derailleur cable system 234 is preferably the same as rear derailleur cable system 62 shown in FIGS. 1-7 and described in detail above in connection with those Figures.

FIGS. 19-31 illustrate details of structure and operation of a first form of rear derailleur handgrip shift actuator 66 according to the invention. In this first form of the invention, compensation for the different effects of derailleur return spring 98 (see FIG. 10) between down-shifting and up-shifting is provided by a two-stage variable spring rate for the shift actuator detent spring, so that down-shifting and up-shifting events require substantially the same amount of handgrip shift actuator effort. In a second and presently preferred form of rear derailleur handgrip shift actuator 66b, shown in FIGS. 39-42, such compensation for the force of rear derailleur return spring 98 is provided for by different detent notch side slopes for the down-shifting and up-shifting directions, as described hereinafter in detail in connection with FIGS. 39-42.

First Form of Rear Derailleur Handgrip Shift Actuator 66

FIGS. 19-31 illustrate a first form of rear derailleur handgrip shift actuator, generally designated 66, wherein the detent spring is provided with a two-stage variable rate between down-shifting and up-shifting, being provided with a lighter spring rate for down-shifting events which work against the derailleur return spring, and a heavier spring rate for up-shifting events which work with the derailleur return spring. These different spring rates are effected synergistically with a rotational shifting of the detent spring that also provides compensation for lost motions or "slop" in the rear derailleur cable system and rear derailleur mechanism, as well as to provide an overshift increment of movement of the rear derailleur control cable. These different spring rates result in generally the same torqueing effort being required for down-shifting and up-shifting by handgrip shift actuator 66.

Rear derailleur shift actuator 66 includes a generally circular body 240 adapted to be fixedly secured to the right-hand part of handlebar 222 inboard of the right-hand fixed handlebar grip 26. Actuator body 240 includes an inner mandrel portion 242 having an annular central opening 243 which allows it to fit over handlebar 222. A threaded radial bore 244 in mandrel portion 242 of body 240 receives a set screw 246, preferably an allen wrench screw, which locks mandrel 242 fixedly on handlebar 222.

A radially outwardly facing arcuate recess 248 in mandrel 242 is adapted to receive a generally complementary arcuate spring member 250, which is preferably made of a tough, resilient resin such as a Delrin, but which could be made of other suitable resin or spring metal. The features of mandrel 242 and spring member 250 which provide the dual spring rate will be described hereinafter in detail.

Fixed body 240 also includes an outer cowling portion 252 which is integral with and extends radially outwardly from mandrel portion 242 of body 240, and includes a generally flat radial portion 254, terminating at its radial outer edge with a cylindrical flange portion 256 which is axially oriented generally toward the end of handlebar 222.

A cable guide tube 258 extends generally tangentially from the outside of flange 256, its central passage registering with a generally tangential hole through the wall of flange 256 for entry of the rear derailleur control cable 64 into the cavity defined within cowling 252. Cable guide tube 258 curves downwardly and inwardly from the end of handlebar 222 for direction to rear derailleur cable system 62. Cable guide tube 258 terminates at its outer end with an end cup 260. A ferrule 262 is crimped over the end of forward cable housing section 122 of rear control cable 64, ferrule 262 seating in cable guide tube end cup 260.

Referring now to the arcuate recess 248 in the mandrel portion 242 of fixed body 240, it includes a pair of arcuately spaced slip surfaces 264 which terminate at respective generally radially oriented end abutment shoulders 266 and 268 of recess 248. Shoulder 266 may be characterized as the "down-shifting" shoulder, since detent spring 250 seats against it during down-shifting events; and shoulder 268 may be characterized as the "up-shifting" shoulder, since the detent spring seats against it during up-shifting events. A pair of ribs or projections 270 and 272 extend radially outwardly from recess 248 at the ends of slip surfaces 264, opposite respective abutment shoulders 266 and 268. Ribs or projections 270 and 272 are spaced apart from each other, but as a pair, they are offset closer to up-shifting shoulder 268 than down-shifting shoulder 266.

Figure 24:
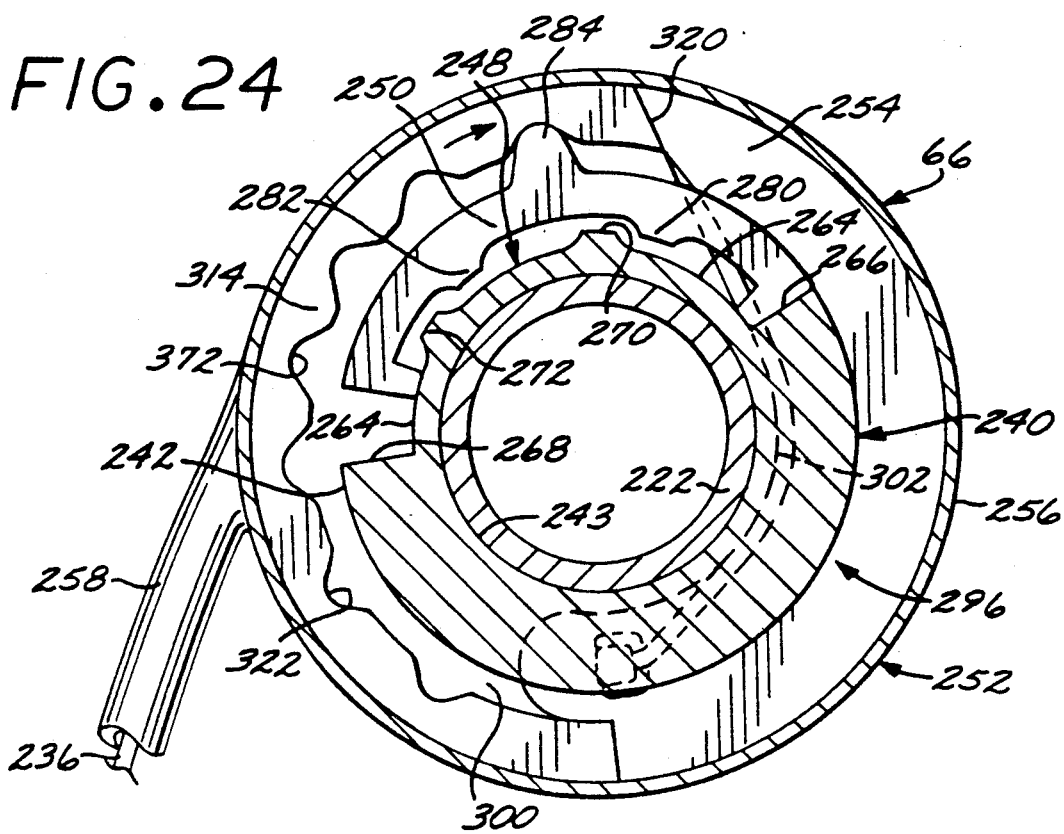
FIG. 24 is a view similar to FIG. 22, illustrating a first increment of down-shifting movement of the rear derailleur handgrip shift actuator in which the detent spring is shifted from a relatively high spring constant to a relatively low spring constant so as to compensate for rear derailleur return, spring force during down-shifting events.
Figure 25:
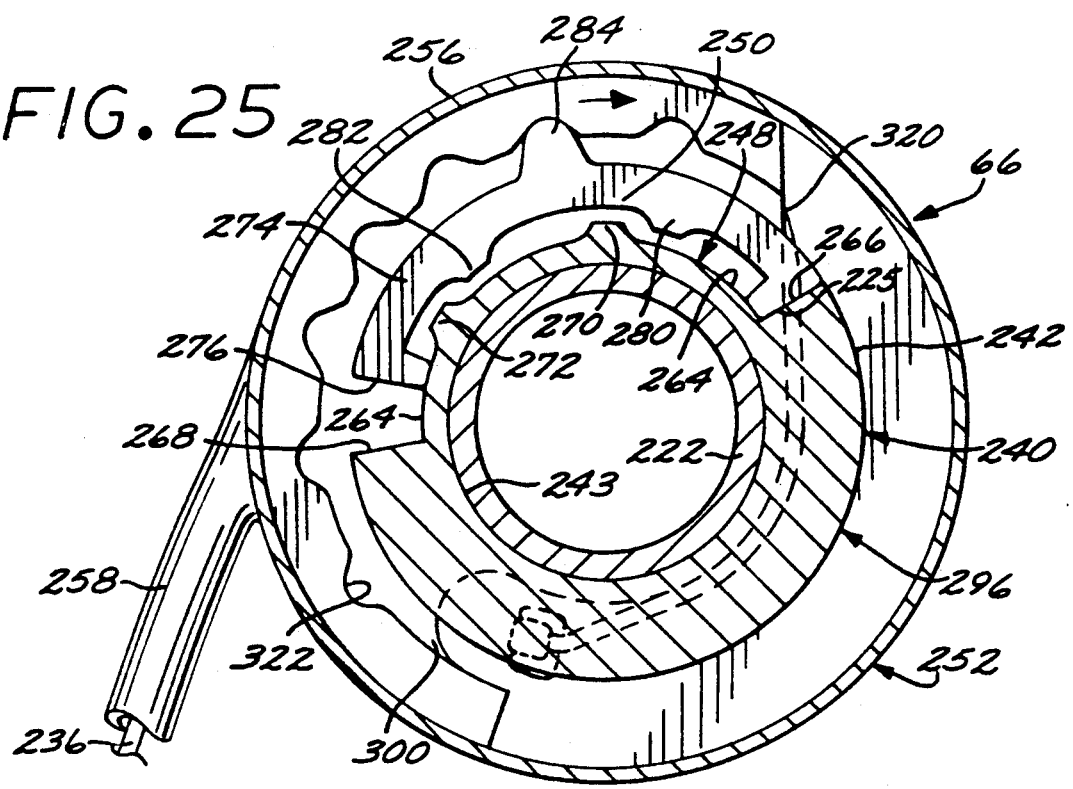
FIG. 25 is a view similar to FIGS. 22 and 24 wherein the rear derailleur handgrip shift actuator of the invention is proceeding through a series of down-shifting events.
Figure 26:
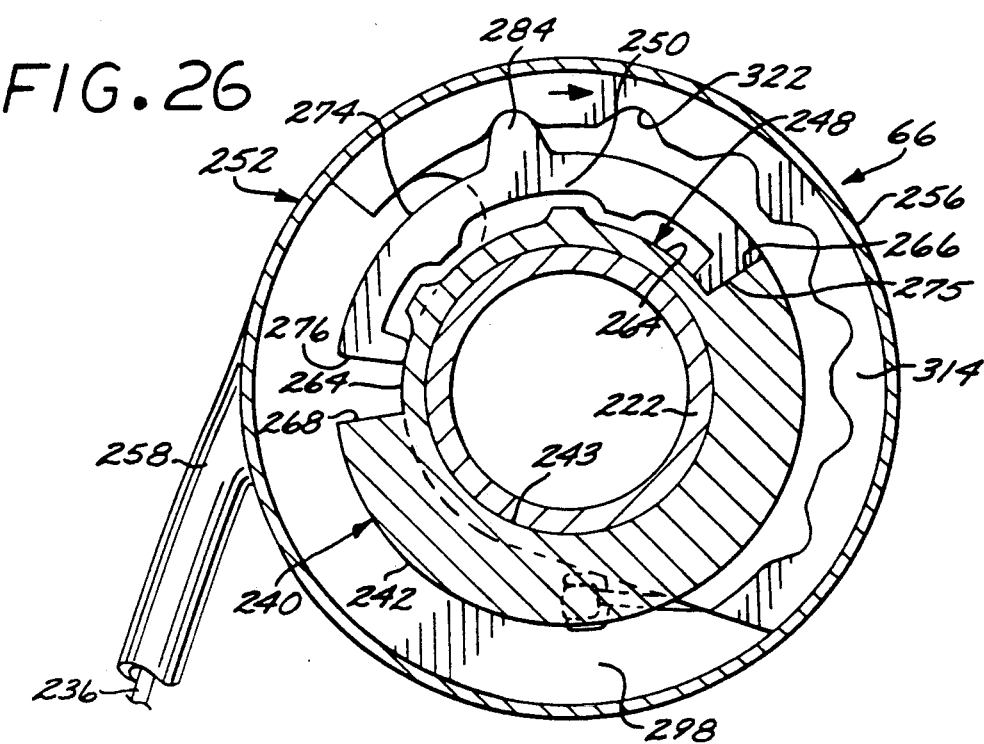
FIG. 26 is a view similar to FIGS. 22, 24 and 25, illustrating the relationship of the parts of the rear derailleur handgrip shift actuator at the completion of a series of down-shifting events.
Figure 28:
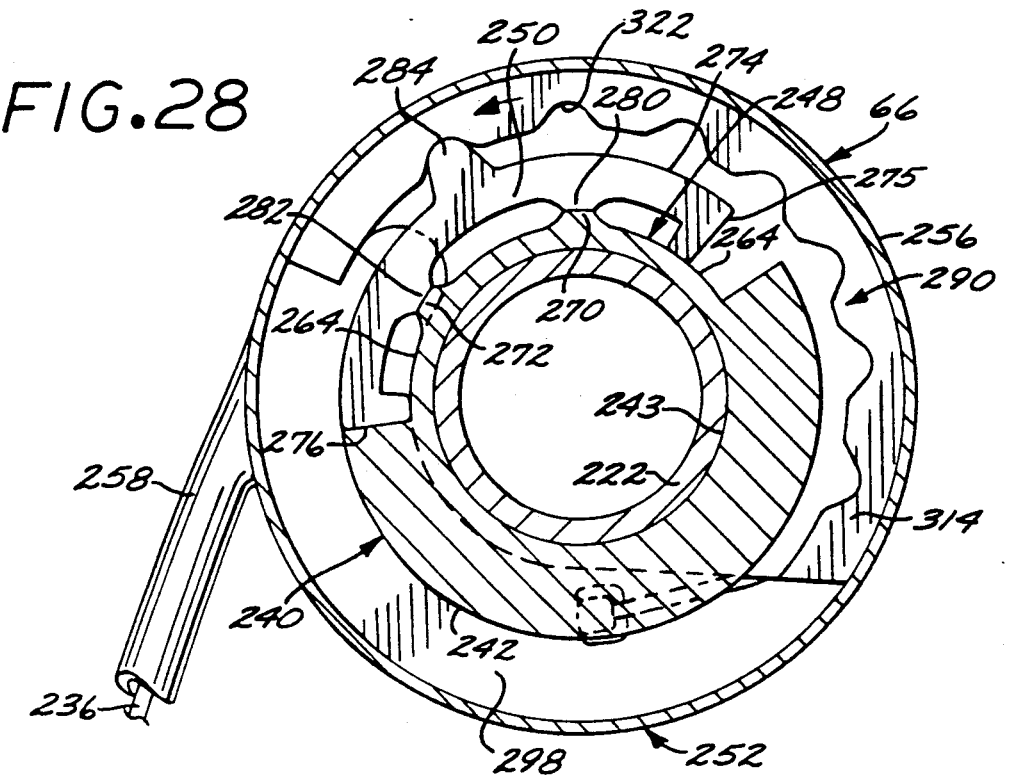
FIG. 28 is a view similar to FIGS. 22 and 24-26 illustrating the initiation of a series of up-shifting events in which the detent spring has been moved to a higher spring rate position to compensate for alleviation of rear derailleur return spring force.
Figure 29:
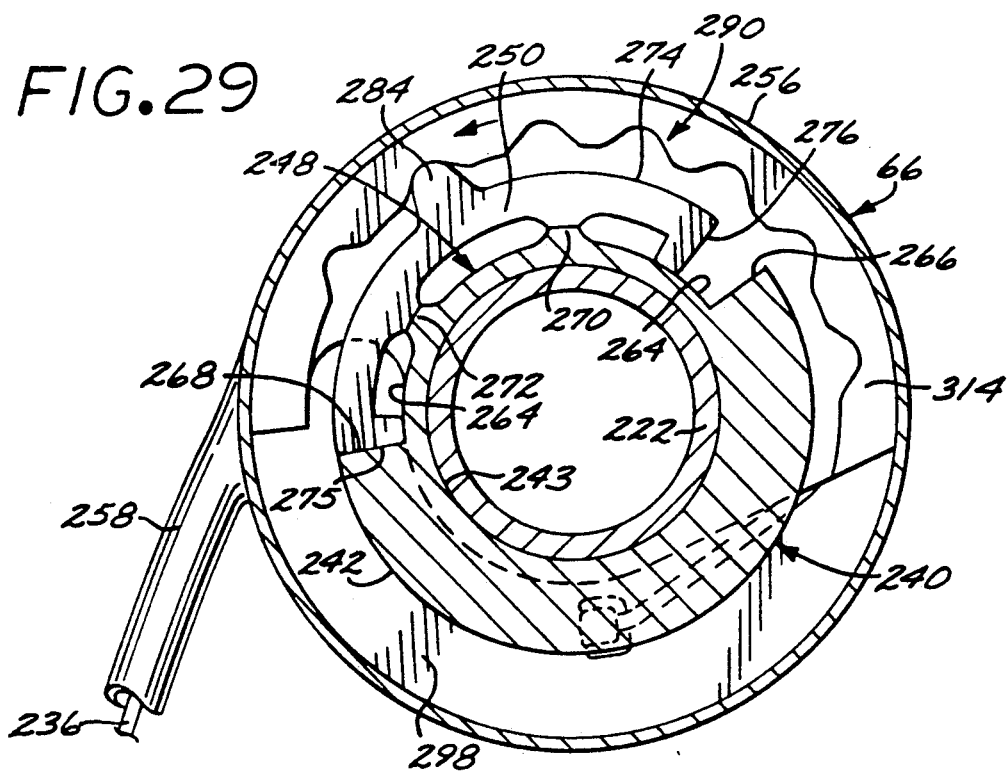
FIG. 29 a view similar to FIG. 28 illustrating a progression of up-lifting events.

The arcuate spring member 250 for this form of the invention will now be described. Spring member 250 has an arcuate body portion 274, with ends thereof 275 and 276 which are adapted to seat against body shoulders 266 and 268 according to whether a down-shifting or up-shifting event is being effected. During a down-shifting event, spring end 275 will abut against end abutment shoulder 266, as seen in FIGS. 24–26, while during an up-shifting event spring end 276 will abut against abutment shoulder 268 as seen in FIGS. 22, 28 and 29.

Arcuate detent spring member 250 has two pairs of generally radially inwardly directed feet or ribs. One pair of these feet or ribs is designated 277 and 278, which are outer end feet located proximate respective ends 275 and 276 of acuate body portion 274 of the spring. The other pair of feet or ribs is designated as inner feet or ribs 280 and 282, since they are inwardly spaced from spring ends 275 and 276, and these inner feet or ribs 280 and 282 are spaced apart the same distance as the spacing between body projections or ribs 270 and 272. However, as a pair, inwardly directed spring ribs 280 and 282 are equally spaced from ends 275 and 276 of arcuate spring body portion 274.

A rounded shift indexing projection 284 exends generally radially outwardly from arcuate body portion 274 of spring member 250.

Outer Handgrip Rotating Portion of Rear Handgrip Shift Actuator 66

The rotating portion of rear handgrip shift actuator 66 is generally designated 290, and is best seen in FIGS. 19 and 21–29. Handgrip rotating portion 290 includes an elongated cylindrical body 292 rotatably supported on handlebar 222 immediately inboard of the fixed right grip 226, which axially locates body 292 on handlebar 222 in the outboard direction. A foam rubber or neoprene grip 294 is fixedly mounted around rotatable cylindrical body 292 for radially enlarged and comfortable hand actuation of handgrip rotating portion 290.

A cable actuating flange structure generally designated 296 extends generally radially outwardly from the axially inner end of cylindrical body 292 (relative to the end of handlebar 222). Looking in stages axially away from the end of handlebar 222, cable actuating flange 296 has the following portions.

Figure 21:
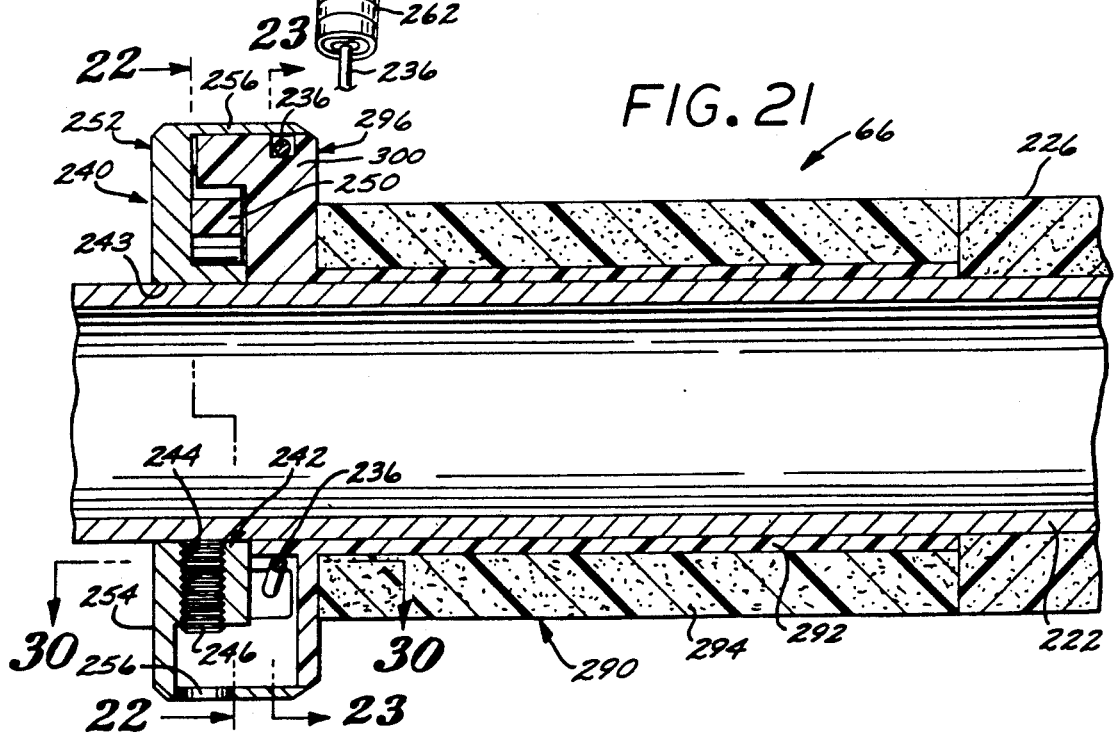
FIG. 21 is an axial sectional view (relative to the handlebar) taken on the ine 21—21 in FIG. 20, illustrating some of the details of construction of the rear handgrip actuator.

First, a disk portion 298 extending radially outwardly from the inner end of cylindrical body 292. In a prototype of the invention, disk portion 298 was made approximately 1 mm in thickness. Second, a cable actuating section generally designated 300, which projects axially from disk portion 298, and in said prototype of the invention had an approximately 3 mm axial exent from the disk portion 298. Cable actuating section 300 is best seen in the radial or diammetrical sections of FIGS. 23 and 27, and is also seen in FIG. 21. A rotationally oriented cable cam groove 302 in cable actuating section 300 opens generally radially outwardly so as to receive rear derailleur control cable 236. Cable actuating section 300 commences rotationally with a thin cylindrical cable slide section 304 which, working counterclockwise in FIGS. 23 and 27, transitions into a "shovel cam" generally designated 306. Shovel cam 306 has a transitional entry portion 308 leading from the thin cylindrical slide section 304, a radially progressing cam ramp portion 310, and primary cam lobe portion 312. The surface of shovel cam 306 is contained in groove 302. Cam groove 302 is generally defined between disk portion 298 of cable actuating flange structure 296 and a third component of cable actuating flange structure 296, which is a generally semicircular detent section 314 projecting axially from cable actuating section 300.

Detent section 314 of cable actuating flange structure 296 has an outer cylindrical surface which registers radially with disk portion 298. An axially thin angular cable guide 320 defines the leading portion of cable cam groove 302 on cable actuating section 300, fairing into detent section 314.

Detent section 314 has a series of radially inwardly opening, circularly spaced detent notches 322 within which the rounded indexing projection 284 of spring member 250 is successively received and detented to index shift drive chain 50 on the respective sprockets of rear derailleur multiple freewheel 52. In the rear derailleur handgrip shift actuator 66 illustrated in FIGS. 19–31, there are seven of these detent notches 322, corresponding to a multiple freewheel 52 having seven sprockets. These detent notches 322 are circularly spaced relative to each other to achieve accurate alignment of drive chain 50 with the respective sprockets of multiple freewheel 52 in the final respective gear-shifted positions of rear handgrip shift actuator 66. Corresponding to the lateral spacing between the various sprockets of multiple freewheel 52, the spacings between detent notches 322 may vary as required for accurate alignment of drive chain 50 with the respective sprockets of multiple freewheel 52.

As seen in full lines in FIGS. 23, 27, 30 and 31, and in dotted lines in FIGS. 22, 24–26, 28 and 29, a stationary cupped cable end bracket 324 is supported on the inner support portion 242 of fixed body 240. The end portion of rear control cable 64 extends through a hole 326 in bracket 324, with a cable end bead 328, usually of lead, being seated in cable end bracket 324. Cable end bracket 324 and cable end bead 328 seated therein secure the handgrip end of rear derailleur control cable 236 in a fixed position relative to actuator body 240 and handlebar 222.

As aforesaid, shovel cam 306 includes three portions, a transitional entry portion 308, a cam ramp portion 310, and a cam lobe portion 312. Cam lobe portion 312 has a cupped end 329. In the highest gear position illustrated in FIGS. 23–26, this cup end 329 engages over fixed cable end bracket 324 and cable end bead 328, this being the most counterclockwise position of handgrip rotating portion 290 as viewed in FIGS. 22–24. In the lowest gear position illustrated in FIGS. 26–28, cupped end 329 is rotationally spaced clockwise about 136° from cable end bracket 324 and end bead 328 as seen in FIG. 27.

Mode of Operation of Rear Derailleur Handgrip Shift Actuator 66 of FIGS. 29–31

Figure 27:
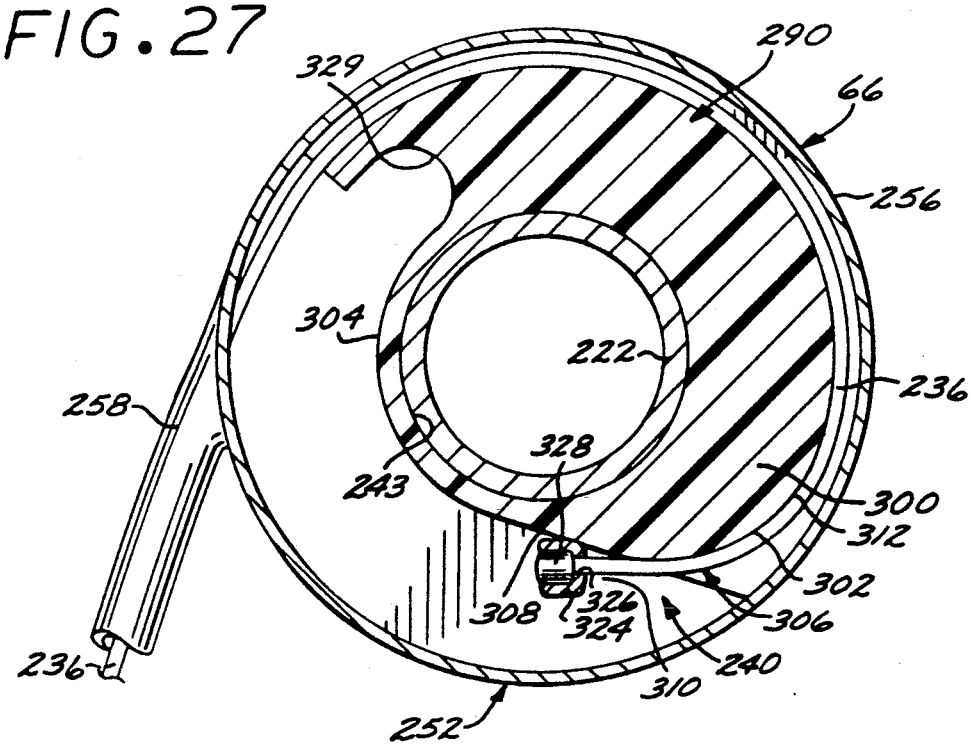
FIG. 27 is a view similar to FIG. 23 illustrating the shovel cam and rear derailleur actuating cable relationship with the cable pulled to its fullest extent at the completion of a series of down-shifting events, the shovel cam corresponding in position to the positioning of the parts in FIG. 26.

Sequential down-shifting events of rear derailleur handgrip shift actuator 66 are illustrated in FIGS. 24–27, with the full down-shifted position shown in FIGS. 26 and 27; and up-shifting events are illustrated in FIGS. 28 and 29, with the full up-shifted position illustrated in FIGS. 22 and 23.

Rear Derailleur Down-Shifting Events

Rear derailleur down-shifting events start from the full up-shifted position illustrated in FIGS. 22 and 23, and progress through FIGS. 24–27, to the full down-shifted position of FIGS. 26 and 27. Down-shifting is from the smallest sprocket of rear derailleur freewheel 52 (the highest gear ratio) through the series of freewheel sprockets to the largest (lowest gear) freewheel sprocket of freewheel 52. The mechanism of rear shift actuator 66 is preferably arranged so that actuator 66 is moved overhand toward the rider during down-shift events, and overhand away from the rider during up-shifting events. Thus, as viewed in FIG. 19, during down-shifting events, the top of shift actuator 66 is being pulled or rotated toward the bicycle rider. The same is true for FIG. 21. For down-shifting events, rear handgrip shift actuator 66 is rotated clockwise in FIGS. 20 and 22-27, with the full down-shifted position shown in FIGS. 26 and 27, the down-shifting directional arrows being shown in FIGS. 24-26.

Referring now to FIGS. 22 and 23, in which this first form of the invention is shown in its full up-shifted position, and therefore in position to start a series of down-shifting events, the parts are in the following locations. (1) Rear control cable 236 is in its most relaxed position, with cam lobe portion 312 of shovel cam 306 in its most counterclockwise position as seen in FIG. 23. (2) Indexing projection 284 on arcuate spring member 250 is lodged in the highest gear (most clockwise as seen in FIGS. 22 and 24) notch of the series 322 of spring detent notches. (3) The end 276 of arcuate spring member 250 (the counterclockwise end as viewed in FIGS. 22, 24-26, 28 and 29) is located against shoulder 268 of arcuate recess 248 in fixed body 240, as seen in FIG. 22. (4) The pair of radially outwardly directed projections 270 and 272 on fixed body 240 is rotationally aligned with the similarly arcuately spaced inner feet 280 and 282 of arcuate spring member 250, to provide the higher spring rate for previous up-shifting events, relative to down-shifting events. (5) Cable end bracket 324 and end bead 328 are received in the cupped end 329 of cable actuating section 300 of rotating handgrip portion 290.

The first step in the down-shifting sequence is best seen in FIGS. 22 and 24, arcuate spring member 250 having been moved from its up-shifting position of FIG. 22 where it abutted against shoulder 268 of fixed body 240 to the down-shifting position of FIG. 24 where the other end of spring member 250 abuts against shoulder 266 of fixed body 240. During this first increment of down-shifting movement, spring indexing projection 284 remains seated in the highest gear spring detent 322 so that with rotation (clockwise in FIGS. 22-24) of handgrip rotating portion 290, spring member 250 is shifted from abutment with fixed shoulder 268 to abutment with fixed shoulder 266, inner feet 280 and 282 of spring member 250 shifting off of the respective projections 270 and 272 so that the spring rate of spring 250 is reduced to the spring rate of the entire length of spring 250 between its outer end feet 277 and 278. This first increment of movement of rotating handgrip portion 290 accomplishes three things. First, shifting of spring 250 to the lower spring rate provides compensation for the increased derailleur return spring force during down-shifting events. Second, it provides handgrip rotating portion 290 a preliminary increment of rotational movement for initial takeup of rear control cable 236 to overcome lost motion in the rear derailleur mechanism and rear derailleur cable system as previously described. Third, it provides an overshift increment of cable movement for positive index shifting, as also previously described.

As down-shifting rotational movement of rotating handgrip portion 290 progresses clockwise as viewed in FIGS. 22-27, indexing projection 284 of arcuate spring member 250 is received in successive spring detents 322 from the highest gear detent as shown in FIG. 24, then through the next highest gear detent as shown in FIG. 25, and finally to the lowest gear detent as shown in FIG. 26.

FIGS. 23 and 27 best illustrate how cable-pulling actuation is accomplished during down-shifting rotational movement of handgrip rotating portion 290. Looking first at FIG. 23, which represents the fully up-shifted position of handgrip rotating portion 290, cam lobe 312 of shovel cam 306 is in its most counterclockwise location, closest to cable guide tube 258, with a substantial extent of rear control cable 236 bent around the small or minor diameter cylindrical cable guide section 304 of cable cam groove 302. Thus, in FIG. 23 cable 236 is let out to its most extended position. As handgrip rotating portion 290 is rotated to pull cable 236 through rear derailleur down-shifting events from the positions of FIGS. 22 and 23 to the final down-shifted positions of FIGS. 26 and 27, shovel cam lobe 312 rotates clockwise as seen in FIGS. 23 and 27 to expand the cable loop around shovel cam 306, progressively moving more and more of cable 23 off of the thin cylindrical cable slide section 304 of cam groove 302 onto the entry, ramp and lobe portions 308, 310 and 312, respectively, of shovel cam 306, thus pulling in cable 236 so as to progressively shift rear derailleur mechanism 56 across multiple freewheel 52.

Shovel cam 306 of the present invention provides a great deal of flexibility for adaptation to, and hence for retrofitting to, the variety of satisfactory rear derailleur mechanisms which have been on the market for the last few years. The differential between the smaller diameter of the thin cable slide section 304 and the larger diameter of shovel cam lobe portion 312 can be tailored to the amount of cable movement required for any particular rear derailleur mechanism, whether past, present or future. Conventional derailleur mechanisms at this time require approximately 0.760 inches of cable to be pulled in order to down-shift from the smallest to the largest freewheel sprocket. Testing has indicated that a diameter differential of from approximately 1 inch for cable slide section 304 to approximately 1.6 inches for cam lobe 312 of the invention will provide this 0.760 inches of cable pulling with approximately 136° of rotation of handgrip rotating portion 290, which is within a normal range of shifting rotation, and also within a normal torque range. For an experimental model of the present invention having a cable slide section 304 diameter of 1 inch and a cam lobe 312 diameter of 1.6 inches, the amount of rotation of handgrip rotating portion 290 can be calculated as pi times (1.6 minus 1, i.e. D-d), which is the 136° referred to above. Thus, there is a considerably greater amount of rotational movement of handgrip rotating portion 290 per increment of cable movement relative to the simple spool actuators noted in the Prior Art section, and hence a considerably greater mechanical advantage over the simple spool actuators, and therefore also the ability to space the rotating detents 322 further apart for more accurate detenting and minimization of wear on the detent walls.

With cable 236 in its released, highest gear position, a substantial extent of the cable within cowling 252 is wrapped around the thin cylindrical section 304 of cable actuating section 300, as seen in FIG. 23. According to the mode of operation of the present invention, the loop of cable wire in cam groove 302 is expanded from this highest gear position to a larger diameter during down-shifting events, while the cable end, at end bead 328, remains stationary on fixed body 240. This is the opposite of conventional simple spool rotating actuators in which the cable end is rotated by the actuator, so that there can be no mechanical advantage. Thus, while a desirable, easy-operating rotable grip 290 of the present invention can have any desired number of degrees of rotation between the highest and lowest gear ratios, as for example a particularly desirable rotational extent of approximately 136°, conventional simple spool shifters are restricted to only about 80° of rotational movement, making pulling much more difficult, detents disadvantageously disposed considerably closer together, and generally requiring derailleur mechanisms to be redesigned for larger amounts of cable movement than the normal approximately 0.760 inches of movement of cable pulling.

By adjusting the ratio of the larger diameter of cam lobe 312 and smaller diameter of cable slide section 304, the amount of cable movement, and correspondingly the amount of mechanical advantage obtained, can be adjusted to perfectly suit, and retrofit to, any existing rear derailleur mechanism. To the contrary, current simple spool handgrip shift actuators require complete redesigning of the derailleur mechanisms to fit the limited rotational capability of the actuator. The derailleur design must be compromised from optimum to order to do this.

The spiral, curving configuration of shovel cam 306 is varied as it progresses through the transition front entry portion 308, cam ramp portion 310, and cam lobe portion 312 so as to adapt to variations in cable pull requirements between the successive different sprockets of rear derailleur freewheel 52. Such cable pull variations are primarily the result of increasing derailleur return spring force for successive down-shifting events, and these variations are compensated for by contouring shovel cam 306 so as to provide a progressive decrease of cable pulling extent per degrees of rotation of handgrip rotating portion 290 during a series of down-shifting events.

The first form of rear derailleur handgrip shift actuator 66 illustrated in detail in FIGS. 20-31 relies primarily upon the two-stage spring rate of the arcuate detent spring member 250 to compensate for the relatively higher force required for down-shifting than up-shifting because of the higher derailleur return spring force during down-shifting. Nevertheless, the amount of pulling effort in down-shifting can be further adjusted, or fine-tuned, for each of the sprockets of rear multiple freewheel 52 by varying the angles of inclination of the sides of detent notches 322. This would be only a relatively small amount of adjustment for the first form of the invention shown in detail in FIGS. 20-31, wherein the dual-rate detent spring 250 provides primary compensation for the difference in derailleur spring force between down-shifting and up-shifting. In a second and presently preferred form of rear derailleur handgrip shift actuator 66b shown in FIGS. 40-43, the primary means of compensation for the difference in rear derailleur return spring force between down-shifting and up-shifting is a difference in the angles of inclination of the opposite sides of the actuator spring detent notches.

It is presently preferred that the progressive height of shovel cam 306 as it progresses into cam lobe portion 312 from ramp portion 310 be sufficient for each of the sprockets of multiple freewheel 52 to cause the rear derailleur mechanism to move the chain a sufficient overshift amount beyond the destination freewheel sprocket in a down-shifting event so that the chain will approach the destination sprocket in the same direction as it would in an up-shifting event, the progressive shovel cam height being sufficient to first release the lost motion backlash in the rear derailleur and cable systems, and then allow some reverse chain movement toward the destination sprocket of freewheel 52. Such chain reversal is an observable phenomenon. In a conventional cable system, cable housing compression and warping are only substantially completely released or backlashed when the cable tension friction vector that opposes down-shift cable movement is reversed to the lesser cable friction vector of up-shift cable movement.

Applicants consider the maximum limit of the height of shovel cam lobe 312 for each down-shift event except the final one to sprocket #1 to be such that shovel cam lobe 312 not cause rear derailleur mechanism 56 to move chain 50 sufficiently far laterally inwardly to cause a double shift, i.e., to skip on over the destination sprocket to the next sprocket. For sprocket #1, applicants consider the upper limit for the height of shovel cam lobe 312 to be such that it not cause rear derailleur mechanism 56 to move chain 50 laterally inwardly sufficiently to derail chain 50 off of sprocket #1. While applicants consider these to be the upper limits for the heights of shovel cam lobe 312 for the respective sprockets of freewheel 52, it is presently preferred that these heights of shovel cam lobe 312 not cause the derailleur mechanism to shift chain 50 laterally during any down-shifting event sufficiently to cause chain rasp against the next freewheel sprocket inboard of the destination sprocket. Nevertheless, for optimum positive index shifting, applicants prefer that each portion of shovel cam lobe 312 relating to a respective sprocket of multiple freewheel 52 be sufficiently high to bring chain 50 as close to the next freewheel sprocket as possible without the chain rasping against the next freewheel sprocket. These maximum and preferred upper limits are observable phenomena.

Up-Shifting of the Rear Derailleur by the First Form of the Invention Shown in FIGS. 21-31

Up-shifting to a smaller freewheel sprocket does not require overshifting for accurate centering of the chain on the destination sprocket, and release of lost motions in the derailleur system and cable system is automatic. Up-shifting is illustrated in FIGS. 27-29, with the fully down-shifted position shown in FIGS. 27 and 28, and up-shifting movement shown in FIG. 29, the up-shifting actuation being illustrated by the rotation arrows shown in FIGS. 28 and 29.

In the fully down-shifted position from which up-shifting may be started, indexing projection 284 of detent spring member 250 is located in the most counterclockwise detent 322 as seen in FIGS. 26 and 28, while shovel cam 306 has cable 236 in its most retracted condition as seen in FIG. 27.

Up-shifting movement of handgrip rotation portion 290 is the opposite of down-shifting movement, and overhand away from the rider as viewed in FIG. 19, or counterclockwise as viewed in FIGS. 22-29. The first increment of such counterclockwise rotational movement of handgrip rotating portion 290 causes arcuate spring member 250 to shift counterclockwise relative to fixed body 240, which causes it to shift from its relatively low spring rate position of FIG. 26 to its relatively high spring rate position of FIG. 28, wherein inner feet 280 and 282 of spring 250 are engaged over ribs or projections 270 and 272 of fixed body 240 so that the handgrip shift actuator operating force is generally the same for up-shifting, which is with derailleur spring force, as for down-shifting, which is against derailleur spring force. This preliminary up-shifting rotation of rotating handgrip portion 290 which moves spring 250 to its higher spring rate position also releases the rear derailleur mechanism and cable system lost motions which may have been left after previous down-shifting. FIG. 29 illustrates handgrip rotating portion 290 progressing counterclockwise, in the up-shifting direction, with indexing projection 284 of spring 250 sequentially shifting between spring detents 322 which correspond to the respective freewheel sprockets.

Front Handgrip Shift Actuator 60

Front handgrip shift actuator 60, which is preferably located immediately inboard of the fixed left handlebar grip 224, is shown in detail in FIGS. 32-39 with respect to both structure and operation. Front derailleur shift actuator 60 includes a generally circular body 240a similar to rear derailleur shift actuator body 240. Body 240a includes an inner mandrel support portion 242a which has an annular central opening allowing it to fit over handlebar 222. A threaded radial bore 244a in mandrel 242a receives a set screw 246a which both rotationally and axially locks mandrel 242a on handlebar 222.

A radially outwardly facing arcuate recess 248a in mandrel 242a is adapted to receive a generally complementary arcuate spring member 250a, which is preferably made of a tough, resilient resin such as Delrin, but which could be made of other suitable resin or spring metal. In front handgrip shift actuator 60, the configuration of arcuate recess 248a cooperates with arcuate spring member 250a so as to (1) provide positive overshift between successive chain rings in the down-shifting direction from a smaller chain ring to a larger chain ring, and (2) enable the chain to be shifted slightly back and forth relative to the particular chain ring upon which it may be engaged so as to eliminate chain rasp or scraping. This requires that arcuate spring member 250a be positively retained in either of two rotational locations which are selective according to nonshifting rotational increments in both directions of the rotating handgrip member, as described in detail hereinafter.

Fixed body 240a has an outer cowling portion 252a which is integral with and extends radially outwardly from mandrel support portion 242a, and includes a generally flat radial portion 254a, terminating at its radial outer edge with a cylindrical flange portion 256a which is axially oriented generally toward the end of handlebar 222. A cable guide tube 258a extends generally tangentially from the outside of flange 256a, its central passage registering with a generally tangential hole through the wall of flange 256a for entry of front derailleur control cable 230 into the cavity defined within cowling 252a. Cable guide tube 258a terminates at its outer end in the same manner as rear derailleur cable guide tube 258 as shown in FIG. 20.

Arcuate recess 248a differs considerably from the corresponding arcuate recess 248 of rear actuator 66. Recess 248a does have respective down-shift and upshift end abutment shoulders 266a and 268a. The configuration of recess 248a is distinctive in having a pair of arcuately wide, radially outwardly projecting ribs 330 and 332 which, in part, define a pair of recess end notches 334 and 336. These recess end notches 334 and 336 are fully defined between the recess outer end abutment shoulders 266a and 268a on the one hand, and arcuately outwardly facing respective shoulders 338 and 340 on respective ribs 330 and 332.

Arcuate spring member 250a is constructed to cooperate with this configuration of recess 248a so as to provide both overshift and selective fine-tuning in front derailleur mechanism 54. Spring member 250a has an arcuate body portion 274a which terminates at ends 275a and 276a. A pair of end feet 277a and 278a proximate respective body ends 275a and 276a extend radially inwardly from body portion 274a, and have rounded cam tips. Arcuate spring member 250a is completed with a generally radially outwardly directed indexing projection 284a which is generally arcuately centrally located on body portion 274a.

The outer rotating portion 290a of front derailleur shift actuator 60 is essentially the same as outer rotating portion 290 of rear derailleur actuator 66, except for the number of its detent notches to accommodate a corresponding number of front derailleur chain wheels, and the configuration of its "shovel cam" to accommodate the front derailleur shifting requirements. Thus, outer handgrip rotating portion 290a includes an elongated cylindrical body 292a, a foam rubber or neoprene grip 294a, and a cable actuating flange structure 296a which is similar to the corresponding flange structure 296 of the first form of rear derailleur handgrip shift actuator 66 previously described in detail. Thus, cable actuating flange structure 296a for front handgrip shift actuator 60 includes a radially oriented disk portion 298a, and a cable actuating section 300a which is generally like cable actuating section 300 of rear derailleur actuator 66 except that the configuration of the shovel cam corresponding to shovel cam 306 is specifically configured to accommodate the requirements of the front derailleur chain rings.

Cable actuating flange structure 296a also includes a generally semicircular detent section 314a which is illustrated in FIGS. 34-38 as having three generally regularly spaced, radially inwardly directed spring detent notches 322a within which indexing projection 284a of spring member 250a is selectively engaged according to actuation by the rider.

Figure 34:
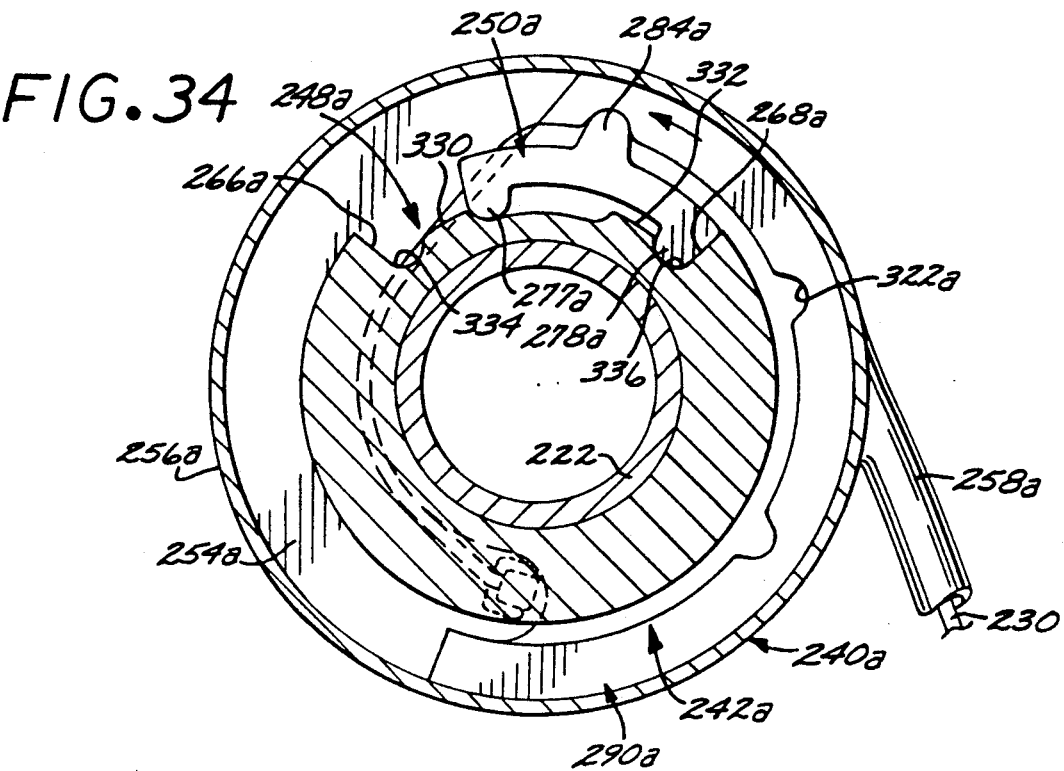
FIG. 34 is a cross-sectional view taken on the line 34—34 in FIG. 33, illustrating the cable released position of the parts of the front derailleur actuator, with the rotational arrow indicating the start of a cable pulling actuation.
Figure 34A:
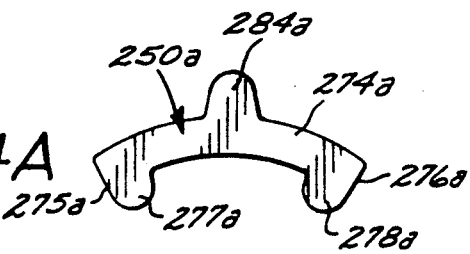
FIG. 34A shows an arcuate spring member.

Cable end bracket 324a is seen in FIGS. 33 and 34, as is cable end bead 328a. These are fixed relative to handlebar 222 in the same manner as cable end bracket 324 and bead 328 in the first form of rear derailleur actuator 66 shown in FIGS. 19-31.

Mode of Operation of Front Handgrip Shift Actuator 60

Figure 35:
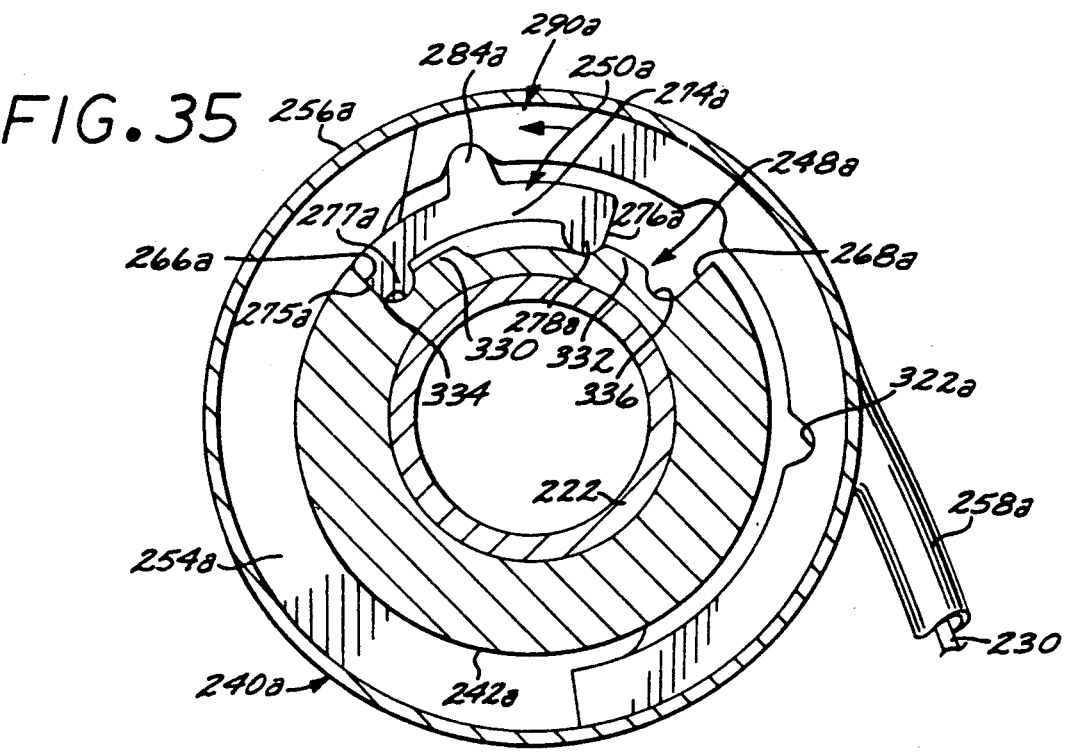
FIG. 35 is a view similar to FIG. 34 which illustrates the first increment of movement in a cable pulling actuation of the front derailleur actuator mechanism, in which the detent spring has been shifted to an overshift position.
Figure 36:
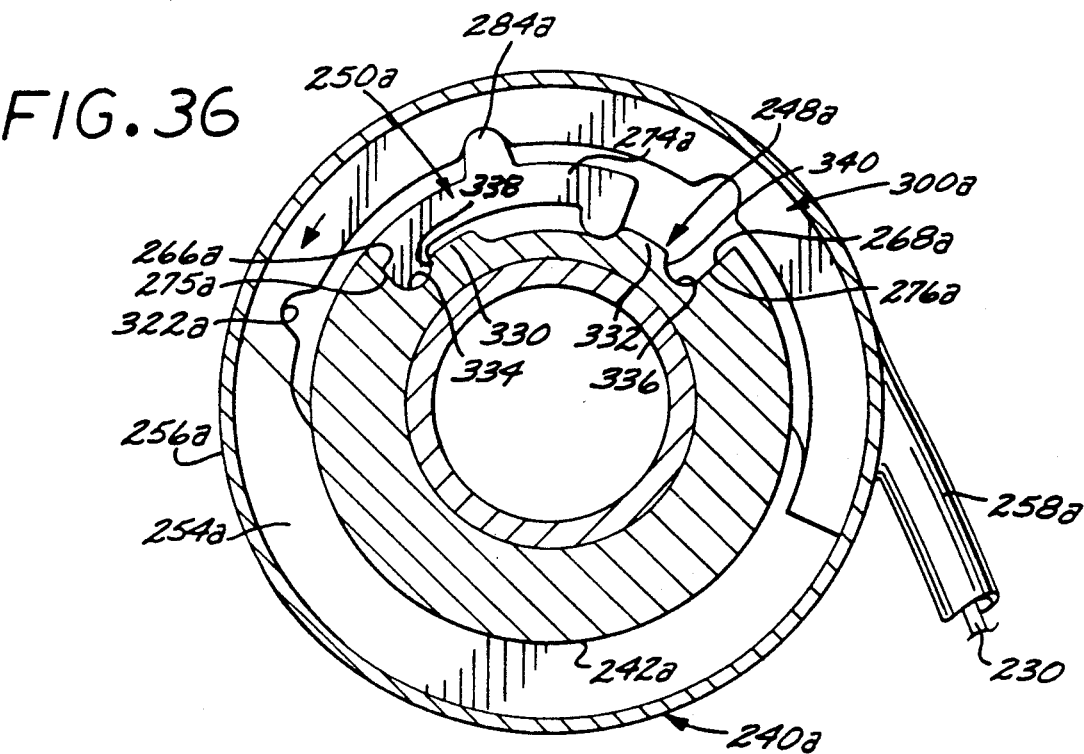
FIG. 36 is a similar view which illustrates continuing cable pulling actuation of the front derailleur during down-shifting.

Front handgrip shift actuator 60 has a two-stage mode of operation somewhat similar to the two-stage operation of the first form of rear derailleur handgrip shift actuator 66 previously described in detail, but serving the two principal purposes of taking up overshift, and then allowing the rider lateral chain shifting options to avoid chain rasp regardless of the lateral location of the rear portion of the chain on multiple freewheel 52. To accomplish these purposes, detent spring 250a of front shift actuator 60 has two rotationally specific positions, one being a fully up-shifted, detented position shown in FIGS. 34 and 38 wherein spring member 250a as viewed in FIGS. 34-38 is in its most clockwise position relative to front shift actuator body 240a, and the other position of spring member 250a being in a most counterclockwise, detented location relative to fixed body 240a as seen in FIGS. 35-37 which is the location of spring 250a during down-shifting events.

The rotational interlock between indexing projection 284a of spring member 250a and spring detent notches 322a on shift actuator rotator 290a is stronger than the rotational interlock between end feet 277a and 278a of spring 250a within fixed end notches 334 and 336 of fixed body 240a. Accordingly, at the initiation of a down-shifting event for the front derailleur, as illustrated in FIGS. 34 and 35, handgrip rotating portion 290a will carry spring member 250a from the fully up-shifted position of FIG. 34 counterclockwise to the down-shifting position of FIG. 35. This prioritized increment of movement of spring 250a will allow rotating handgrip portion 290a to pull front derailleur cable 230 to an overshift location of drive chain 50 relative to the front derailleur destination chain ring to which it is being moved, e.g., from the smallest front derailleur chain ring to the middle front derailleur chain ring of a three-chain ring cluster. The relative locations of the parts in this situation are illustrated in FIG. 36, wherein indexing projection 284a of spring 250a is located in middle spring detent 322a of handgrip rotator 290a, and spring 250a is located in its most counterclockwise position.

Figure 37:
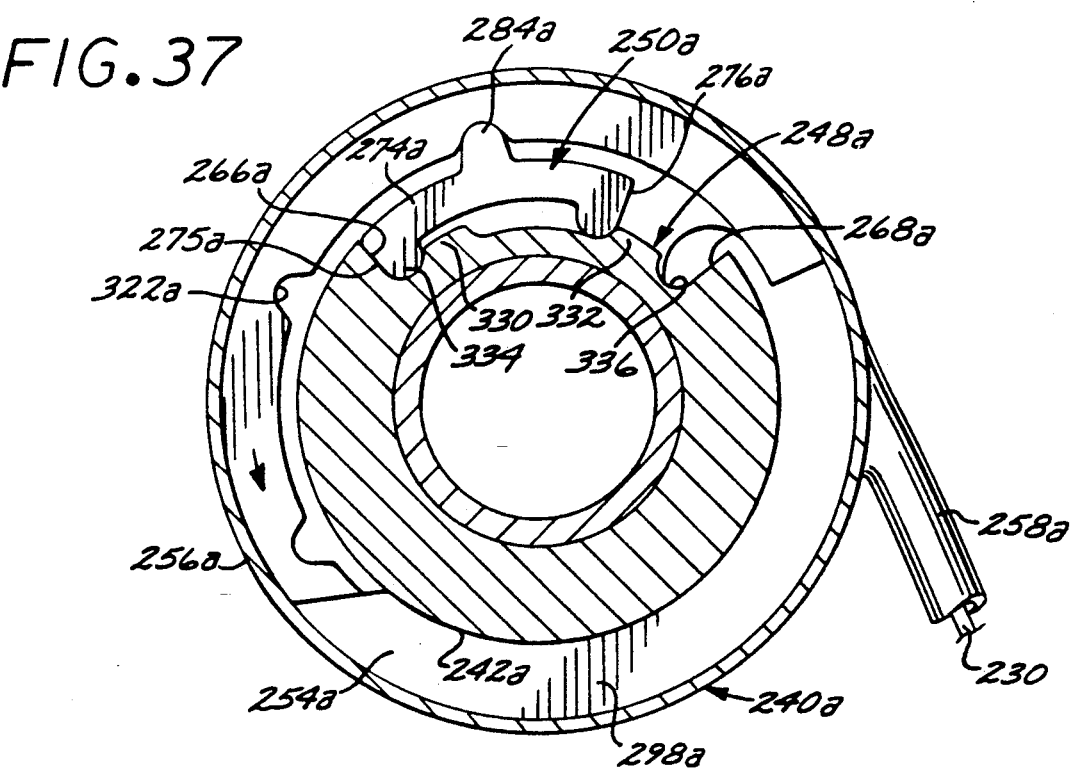
FIG. 37 is a similar view which illustrates completion of a series of front derailleur down-shifting events.

With chain 50 thus engaged in an overshifted position on the middle front derailleur chain ring, further down-shifting rotation of handgrip rotator 290a (counterclockwise as viewed in FIGS. 34-37) will move the most clockwise detent 322a of handgrip rotator 290a into engagement with spring indexing projection 284a, as shown in FIG. 37. This corresponds to the largest, lowest gear chain ring, still with an overshift component of outward lateral chain location due to the counterclockwise detented position of spring 250a as seen in FIGS. 35, 36 and 37.

Thus, while the overshifting increments of movement of chain 50 during down-shifting are automatically accommodated by the counterclockwise movement of spring 250a as viewed in FIGS. 34-38, the lateral chain location can be fine-tuned to avoid chain rasp in any one of the three chain ring locations by rotation of front actuator rotator 290a overhand away from the rider a sufficient amount to shift spring 250a clockwise as seen in FIGS. 34 and 38, but insufficiently to shift up from a larger chain ring to a next smaller chain ring. The rider thus has two optional fine-tune positions for the chain, as required to eliminate chain rasp according to the lateral location of the rear portion of chain 50 on multiple freewheel 52, the down-shifting location of spring 250a as viewed in FIGS. 35-37, or the up-shifting position of spring 250a as viewed in FIGS. 34 and 38.

Up-shifting from larger chain rings to smaller chain rings is illustrated in FIG. 38 where the rotational arrow for handgrip rotator 290a is in the clockwise direction, indicating overhand rotation of rotator 290a away from the rider. During such up-shifting, front handgrip shift actuator 60 operates in reverse from down-shifting, its first increment of movement moving detent spring 250a clockwise or to the right as seen in FIG. 38 to release any overshift chain positioning that may have remained from down-shifting, and then further movement shifting successive spring detent notches 322a of rotator 290a into detented cooperation with spring indexing projection 284a. Again, as with a series of down-shifting events, such a series of up-shifting events leaves the rider with the option of two detented positions of handgrip rotator 290a so as to avoid chain rasp according to the lateral location of the rear portion of chain 50 on multiple freewheel 52.

FIG. 39 diagrammatically illustrates sequences of down-shifting and up-shifting events for a three chain ring front derailleur system. In FIG. 39 the upper series of curving arrows represents three down-shifting events, while the lower series of curving arrows represents three up-shifting events. Looking from right to left in FIG. 39, at the right-hand side is the smallest of the three front derailleur chain rings; in the middle is the middle or intermediate size chain ring; and at the left side is the large chain ring. These are designated S, M and L, respectively, in FIG. 39. Vertical dotted lines bracket each of these three chain rings S, M and L, indicating each of the two chain positions available to the rider for each of the three chain rings S, M and L.

At the top of FIG. 39, numbers 1 and 2 indicate the two optional chain positions on opposite sides of the small chain ring, numbers 3 and 4 indicate the two optional chain locations on opposite sides of the middle chain ring, and numbers 5 and 6 indicate the two optional positions on opposite sides of the large chain ring. At the bottom of FIG. 39, positions 1 and 2 are also marked A and B, positions 3 and 4 are also marked A and B, and positions 5 and 6 are also marked A and B. A represents the up-shifted location of spring 250a illustrated in FIGS. 34 and 38, while B illustrates the down-shifted position of spring 250a illustrated in FIGS. 35-37.

In a down-shifting sequence, chain 50 will start at either position 1 or position 2, with the starting position of spring 250a at either respective position A or B, according to rider adjustment to avoid chain rasp. If the chain is in position 1, and spring 250a in position A, the first increment of movement in a down-shifting event will be from position 1 to position 2, moving the spring from its position A to its position B. The middle upper arrow indicates movement from position 2 to position 4, indicating overshift lateral chain movement from small chain ring S to middle chain ring M, with an overshift increment of movement of the chain beyond middle chain ring M to position 4, which is enabled by shifting of spring 250a to its B position. Further down-shifting to large chain ring L is indicated by the left-hand upper arrow and similarly involves an overshift increment to the position 6, wherein spring 250a is in its position B.

In any of these three chain ring locations, small, middle or large, front shift actuator rotator 290a can be rotationally adjusted to place spring 250a in either of its detented locations A or B to avoid chain rasp, which is generally determined by the sprocket of rear multiple freewheel 52 upon which the chain is located at the time. Thus, chain 50 may optionally be located in either position 1 or 2 for the small chain ring S, position 3 or 4 for the middle chain ring M, or position 5 or 6 for the large chain ring L.

Up-shifting from large chain ring L through middle chain ring M to small chain ring S leaves these same anti-chain rasp options. At the start of a series of up-shifting events, the chain will be in either position 6 or position 5, with detent spring 250a correspondingly in either respective position B or position A. If in position 6/B, the first increment of movement of front derailleur shifter 60 will move the chain to position 5 and detent spring 250a to position A. Continuing up-shifting movement of shifter rotator 290a will shift the chain laterally inwardly from large chain ring L past the position 4/B to the position 3/A for positive shifting of the chain onto middle chain ring M; and further up-shifting rotation of handgrip rotator 290a will then shift the chain past position 2/B to position 1/A for positive shifting of chain 50 onto small chain ring S.

Thus, in both the down-shifting and up-shifting directions, overshift is automatically provided for by detented rotational shifting of spring 250a on mandrel 242a, and in each shifting event the rider is left with the option of selecting two chain positions which are slightly on opposite sides of the respective three chain rings so as to assure the ability to eliminate chain rasp.

Second Form of Rear Derailleur Handgrip Shift Actuator 66b

FIGS. 40–43 illustrate a second and presently preferred form of rear derailleur handgrip shift actuator, generally designated 66b, wherein the detent spring has a fixed spring rate for both down-shifting events working against the derailleur return spring and up-shifting events working with the derailleur return spring. In this second form of rear derailleur handgrip shift actuator 66b shown in FIGS. 40–43, the primary means for compensation of the difference in rear derailleur return spring force between down-shifting and up-shifting events is a difference in the angles of inclination of the opposite sides of the actuator spring detent notches. The actuator spring notches can be angled to suit any prior, present or future rear derailleur mechanism to compensate for the higher derailleur return spring force during down-shifting than during up-shifting, and also to fine-tune the shifting for each of the sprockets of rear multiple freewheel 52. The detent spring in the second form of the invention presently to be described rotationally shifts to different locations between down-shifting and up-shifting in the same manner as the detent spring in the first form derailleur actuator shown in FIGS. 19–31 so as to provide compensation for lost motions or "slop" in the rear derailleur cable system and rear derailleur mechanism, as well as to provide an overshift increment of movement of the rear derailleur control cable.

Rear derailleur shift actuator 66b of FIGS. 40–43 is constructed the same and has the same mode of operation as rear derailleur shift actuator 66 shown in FIGS. 19–31, except only for the configurations of the detent spring member, mandrel arcuate recess for the detent spring member, and the side slopes of the spring detent notches in the handgrip rotator.

Thus, rear derailleur shift actuator 66b includes a generally circular body 240b adapted to be fixedly secured to the right-hand part of handlebar 222 inboard of the right-hand fixed handlebar grip 26. Actuator body 240b includes an inner mandrel portion 242b having an annular central opening 243b which allows it to fit over handlebar 222. A threaded radial bore 244b in mandrel 242b receives a set screw 246b, preferably an allen wrench screw, which locks mandrel 242b fixedly on handlebar 222.

Radially outwardly facing recess 248b in mandrel 242b receives generally complementary arcuate spring member 250b, which is preferably made of a tough, resilient resin such as a Delrin, but which could be made of other suitable resin or a spring metal material.

Fixed body 240b also includes outer cowling portion 252b which is integral with and extends radially outwardly from mandrel 242b, and includes generally flat radial portion 254b and outer cylindrical flange portion 256b. Cable guide tube 258b is structurally and operationally the same as cable guide tube 258 best shown in FIG. 20.

Arcuate recess 248b in mandrel 242b differs from the corresponding arcuate recess 248 in the first form of rear derailleur actuating mechanism 66 in that it has an uninterrupted arcuate slip surface 264b which allows for the constant spring rate of arcuate spring member 250b. Arcuate recess 248b has generally radially oriented end abutment shoulders 266b and 268b.

Referring now specifically to detent spring member 250b, it has an arcuate body portion 274b which is generally complementary to arcuate recess 248b, and which has ends 275b and 276b. Spring member 250b has only one pair of generally radially inwardly directed feet, which are end feet 277b and 278b. Otherwise, the inner surface of spring body 274b is uninterrupted. Rounded indexing projection 284b projects generally radially outwardly from spring body 274b, generally centrally located between ends 275b and 276b of spring body 274b.

Outer Handgrip Rotating Portion of Rear Handgrip Shift Actuator 66b

The rotating portion of the second form of rear handgrip shift actuator 66b is generally designated 290b, and is the same in both structure and operation as the rotator 290 for the first form of rear handgrip shift actuator 66, with two exceptions. First, its spring detent notches have shallower angles of inclination on their up-shifting sides than on their down-shifting sides so as to compensate for the higher rear derailleur return spring loading in the down-shifting direction. Second, cable slide section 304 of actuator 66 has been replaced by a fixed cable-wrap flange, as described in detail below. Thus, handgrip rotator 290b includes an elongated cylindrical body 292b rotatably supported on handlebar 222 immediately inboard of a fixed right grip 226, which axially locates body 292b on handlebar 222 in the outboard direction. A foam rubber or neoprene grip 294b is fixedly mounted around rotatable cylindrical body 292b for radially enlarged and comfortable hand actuation of rotating portion 290b.

The cable actuating flange structure generally designated 296b extends generally radially outwardly from the axially inner end of cylindrical body 292b (relative to the end of handlebar 222). Cable actuating flange structure 296b includes radially oriented disk portion 298b and outer cable actuating section 300b. Cable actuating section 300b includes a cable cam groove 302b which is preferably the same as cable cam groove 302 of the first form of rear handgrip shift actuator 66, including similarly contoured shovel cam 306b having a transitional entry portion 308b, a cam ramp portion 310b and a cam lobe portion 312b.

In the shift actuator form 66b, inner support mandrel 242b includes a fixed axial flange 350 directed toward the handlebar end and radially immediately adjacent handlebar 222. This fixed axial flange 350 replaces cable slide section 304 of rotating handgrip portion 290 of the first form 66 of rear derailleur actuator. Thus, the also-fixed end portion of cable 236 wraps around fixed flange tube 350 before it enters cable cam groove 302b, which eliminates any rubbing of the cable end portion as was characteristic of the sliding contact between the cable end portion and the cable slide portion 304 of handgrip rotator 290 of the first form of derailleur actuator 66.

Continuing with cable actuating flange structure 296b, it includes a generally semi-circular detent section 314b which has a series of spaced, generally radially inwardly opening spring detents 322b, seven of these being shown in FIG. 41 to accommodate seven sprockets of a multiple freewheel 52, the rounded spring indexing projection 284b being successively received in these detent notches 322b. Each of spring detent notches 322b has a relatively shallow angle of inclination for addressing rounded spring indexing projection 284b on its cable pulling side 360, as for example approximately 30°, and has a relatively steep angle of inclination for addressing the rounded indexing projection 284b on its cable release side 362, as for example approximately 60°. This difference between the angles of inclination on the cable pulling sides 360 of detent grooves 322b and the cable release sides 362 of spring detents 322b substantially equalizes the difference in the amount of force exerted by the rear derailleur cable return spring between cable pulling and cable releasing for respective down-shifting movements of actuator 66b and up-shifting movements of actuator 66b. As best seen in FIG. 43, rounded spring indexing projection 284b has an included angle that is somewhat less than 60° to accommodate an approximately 60° angle of inclination for cable release sides 362 of spring detents 322b. Thus, the cable release side of indexing projection 284b is somewhat less than approximately 30°. If desired, the cable pulling side of rounded indexing projection 284b could have a greater included angle, although somewhat less than 60°.

The cable end within shifter 66b terminates with an end bead 328b seated in a cable end bracket 324b, and these may be the same as end bead 328 and end bracket 324 shown and described with the first form of rear handgrip shift actuator 66; alternatively, the cable end may be brought to the outside of cowling 252 through a hole in cowling disk 254a, with the cable end bead located externally.

Figure 44:
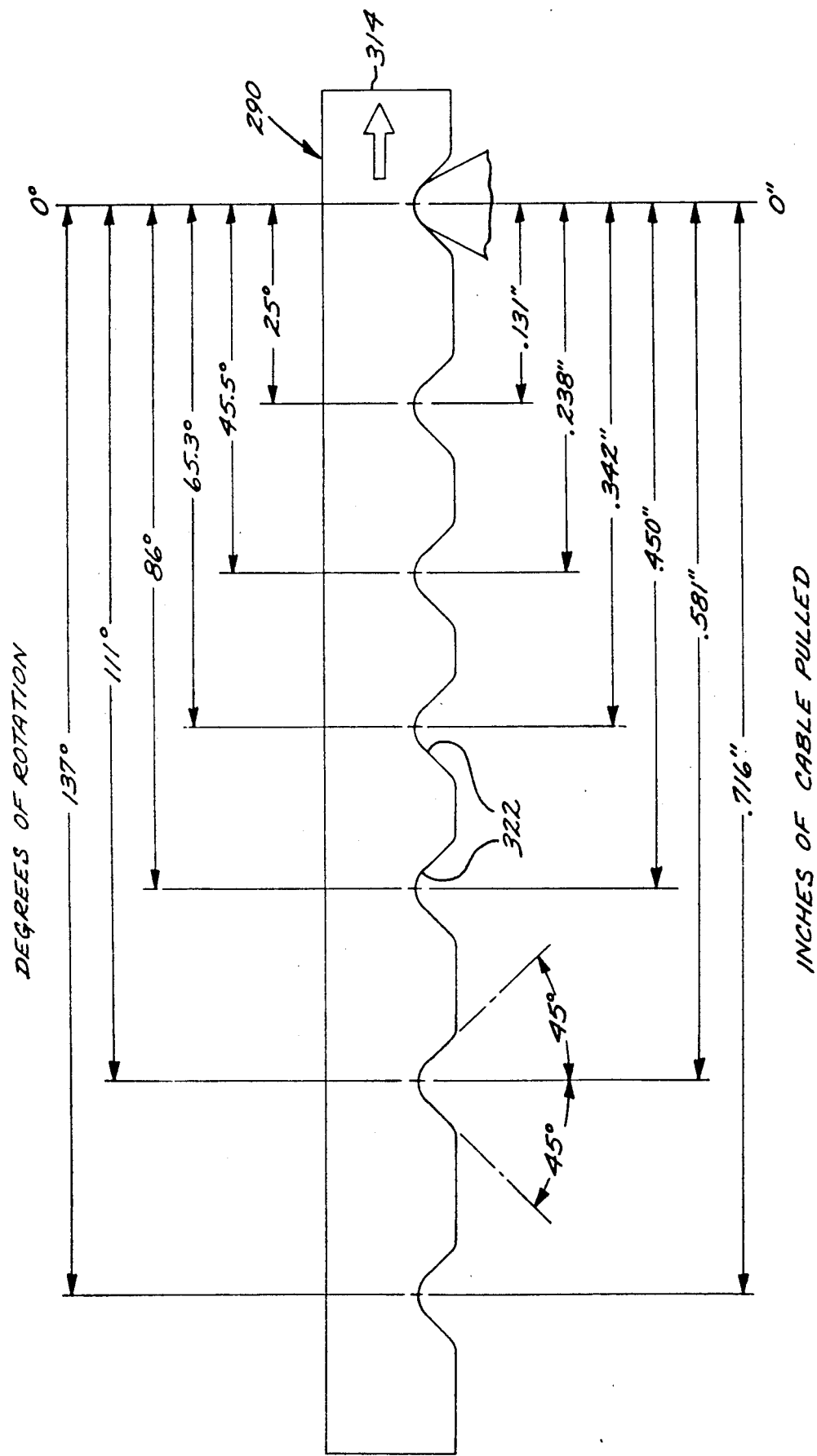
FIG. 44 is a laid-out diagrammatical view which illustrates the detenting arrangement, and representative cable pulling extents and corresponding handgrip actuator rotational extents for the first form of rear handgrip actuator illustrated in FIGS. 19-31.

FIG. 44 is a diagrammatic illustration of the detent section 314 of rotator 290 for rear handgrip actuator 66, giving representative values for the amount of cable pulled and the number of degrees of rotation of handgrip rotator 290 for the various detents 322. In FIG. 44 detent section 314 of handgrip rotator 290 has been laid out flat for clarity and understanding.

Figure 45:
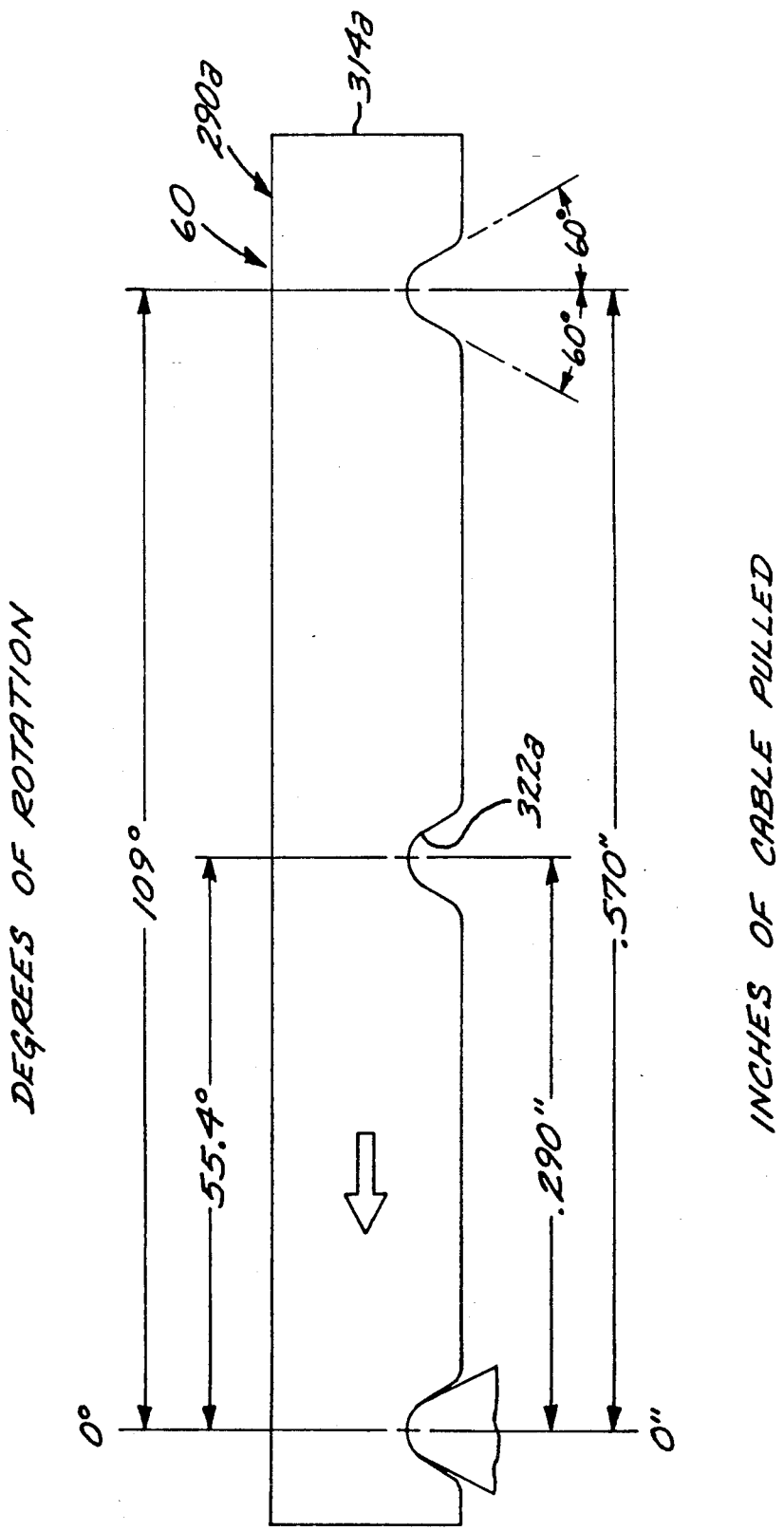
FIG. 45 corresponds with FIG. 44 with respect to the front derailleur shift actuator illustrated in FIGS. 32-39.

FIG. 45 is a view similar to FIG. 44 but for detent section 314a of rotator 290a for front derailleur shift actuator 60, also indicating representative amounts of cable pull and degrees of rotation for the various detents 322a.

While the present invention has been shown and described herein in what are conceived to be the most practical and preferred embodiments, it is recognized that departures may be made therefrom within the scope of the invention, which is therefore not to be limited to the details disclosed herein, but is to be afforded the full scope of the appended claims.

What is claimed is:

1. A bicycle gear shifting system, which comprises:
    derailleur shifting means having return spring means operatively associated with the rear wheel of the bicycle;
    handgrip shift actuator means comprising a rotatable portion mounted on the bicycle handlebar generally coaxially of the handlebar;
    cam means on said rotatable portion of said shift actuator means;
    control cable means having one end fixedly secured relative to said handlebar and the other end operatively connected to said derailleur shifting means, said cable means being biased toward said derailleur shifting means by said return spring means;
    said cam means comprising cam lobe means over which said cable means is looped;
    said cam lobe means being configured so that movement thereof in one direction will cause said cam lobe means to pull said cable means against the biasing force of said spring means so as to cause down-shifting of said shifting means, and rotation thereof in the opposite direction will release said cable means in the direction of the biasing force of said spring means so as to cause up-shifting of said shifting means.

2. A bicycle derailleur gear shifting system as defined in claim 1, wherein said handgrip shift actuator cam means is engaged over the outside of the handlebar substantially inboard of an end of the handlebar.

3. A bicycle derailleur gear shifting system as defined in claim 1, wherein said cam means is configured so as to substantially compensate for increasing force of said return spring means in the down-shifting direction of said derailleur shifting means.

4. A bicycle derailleur gear shifting system as defined in claim 1, wherein said cam means is configured so as to substantially compensate for the lost motions in said derailleur shifting means and said cable means.

5. A bicycle derailleur gear shifting system as defined in claim 1, wherein said derailleur shifting means is a rear derailleur shifting means, and said cam means is configured so as to cause said derailleur shifting means to move the bicycle chain a sufficient amount beyond the destination freewheel sprocket of said derailleur shifting means in a down-shifting event so that the chain will approach the destination sprocket in the same direction as it would in an up-shifting event.

6. A bicycle derailleur gear shifting system as defined in claim 5, wherein said cam means is configured so that said movement of the bicycle chain beyond said destination sprocket is insufficient to cause a double shift.

7. A bicycle derailleur gear shifting system as defined in claim 5, wherein said destination sprocket is the largest freewheel sprocket, and said cam means is configured so that movement of the bicycle chain beyond said destination sprocket is insufficient to cause the chain to derail from said destination sprocket.

8. A bicycle derailleur gear shifting system as defined in claim 5, wherein said cam means is configured so that said movement of the bicycle chain beyond said destination sprocket is insufficient to cause the chain to rasp against the next sprocket beyond said destination sprocket.

9. A bicycle derailleur gear shifting system as defined in claim 1, wherein said cam lobe means expands the portion of said cable means which is looped thereover during down-shifting, and reverses the motion to allow contraction of the cable means portion looped thereover during up-shifting.

10. A bicycle derailleur gear shifting system as defined in claim 1, wherein said handgrip shift actuator means also comprises a mandrel portion fixedly secured to said handlebar upon which spring means is supported, said spring means having indexing projection means thereon;
    said rotatable portion of said shift actuator means having a series of detent notches thereon which are engageable with said indexing projection means for selectively holding said shift actuator means in a desired gear-shifted position.

11. A bicycle gear shifting system as defined in claim 10, wherein the number said detent notches corresponds to the number of rear derailleur freewheel sprockets.

12. A bicycle derailleur gear shifting system as defined in claim 11, wherein said detent notches have different down-shifting and up-shifting slopes, said down-shift notch slopes having a gentler angle of inclination than said up-shifting slopes so as to substantially compensate for the higher rear derailleur spring force during down-shifting events.

13. A bicycle derailleur gear shifting system as defined in claim 10, wherein said spring means is shiftable between controlled limits which enable said rotatable portion to take up lost motions in the rear derailleur system and its cable system during down-shifting before an actual shifting event occurs, and then allows for release of such lost motions during up-shifting.

14. A bicycle derailleur gear shifting system as defined in claim 13, wherein such shifting movement of said spring means additionally provides an overshift increment of movement of said cable means during down-shifting of the rear derailleur mechanism.

15. A bicycle gear shifting system as defined in claim 13, wherein such shifting movement of said spring means shifts said spring means from a relatively lower spring rate for down-shifting to a relatively higher spring rate for up-shifting, so as to substantially compensate for the higher force of the derailleur return spring during down-shifting.

16. A bicycle derailleur gear shifting system as defined in claim 10, wherein the number of said detent notches corresponds to the number of front chain ring sprockets.

17. A bicycle derailleur gear shifting system as defined in claim 12, wherein said spring means indexing projection constitutes a primary, generally radially outwardly facing indexing projection which coacts with said detent notches in a primary detent system in order to provide location for the bicycle chain on respective front chain ring sprockets;

and a secondary detent system wherein said spring means has at least one generally radially inwardly directed foot which coacts with fixed notch means in said mandrel portion which provides two rotational positions for said spring means;

said primary detent system being prioritized over said secondary detent system so that said rotatable portion will first move said spring means to allow for an overshift increment of cable movement during down-shifting events, and move said spring means back to release cable at the commencement of up-shifting events;

movement of said rotatable portion a relatively small nonshifting amount enabling the bicycle rider to shift said spring means back and forth between its said two secondary detented positions for elimination of chain rasp.

18. A method for shifting gears in a bicycle derailleur gear shifting system having a derailleur shifting mechanism, shift actuator means comprising a rotatable portion mounted on the bicycle handlebar generally coaxial of the handlebar, cam means on said rotatable portion, and cable means having one end fixedly secured relative to said handlebar and the other end operatively connected to said derailleur shifting means, said method comprising:

providing said cam means with cam lobe means over which said cable means is looped;

and providing said cam lobe means with a configuration such that rotation thereof in one direction will cause said cam lobe means to pull said cable means so as to cause down-shifting of said shifting means, and rotation thereof in the opposite direction will release said cable means so as to cause up-shifting of said shifting means.

* * * * *